(12) United States Patent
Oshiro et al.

(10) Patent No.: US 7,232,980 B2
(45) Date of Patent: Jun. 19, 2007

(54) MICROSCOPE SYSTEM

(75) Inventors: Masafumi Oshiro, Hamamatsu (JP); Koji Ichie, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 129 days.

(21) Appl. No.: 10/967,301

(22) Filed: Oct. 19, 2004

(65) Prior Publication Data

US 2005/0258335 A1    Nov. 24, 2005

(30) Foreign Application Priority Data

May 24, 2004    (JP)    ............................ P2004-153898

(51) Int. Cl.
G02B 7/04    (2006.01)
G01N 21/64    (2006.01)

(52) U.S. Cl. .................................... 250/201.3; 359/368

(58) Field of Classification Search ............ 250/201.3, 250/216, 208.1; 359/368, 381, 383
See application file for complete search history.

(56) References Cited

U.S. PATENT DOCUMENTS 6,677,565 B1 * 1/2004 Wahl et al. ............... 250/201.3
2001/0017354 A1 * 8/2001 Naya ......................... 250/458.1

FOREIGN PATENT DOCUMENTS

| JP | 58-221817 | 12/1983 |
|---|---|---|
| JP | 59-007320 | 1/1984 |
| JP | 2-243071 | 9/1990 |
| JP | 3-293610 | 12/1991 |
| JP | 8-21961 | 1/1996 |
| JP | 3390106 B | 12/1996 |
| JP | 9-230250 | 9/1997 |
| JP | 10-227971 | 8/1998 |
| JP | 11-132748 | 5/1999 |
| JP | 11-264937 | 9/1999 |
| JP | 2004-46132 | 2/2004 |

* cited by examiner

Primary Examiner—Stephone B. Allen
(74) Attorney, Agent, or Firm—Drinker Biddle & Reath LLP

(57) ABSTRACT

A microscope system comprises a light guiding optical system 20 containing an objective lens 21 and a beam splitter 25 for splitting an optical image of a sample S to a first optical path and a second optical path, a photodetector 31 disposed on the first optical path used to acquire an image of the sample S, and a CCD camera 32 disposed on the second optical path for acquiring a two-dimensional image for focus control. The camera 32 is disposed being inclined at an angle of θ with respect to the optical path so that the optical path length in the light guiding optical system 20 varies along the z-axis direction. The image acquired by the camera 32 is analyzed by a focus controller 37, and the focal point for image pickup with respect to the sample S is controlled on the basis of the analysis result. Accordingly, there can be implemented a microscope system in which image acquisition of the sample and focus control for image pickup can be simultaneously performed.

8 Claims, 27 Drawing Sheets

Fig.7
(a) FOCUS POSITION:-4μm    CALCULATED CENTER-OF-GRAVITY OF FOCAL POINT F: -49.7
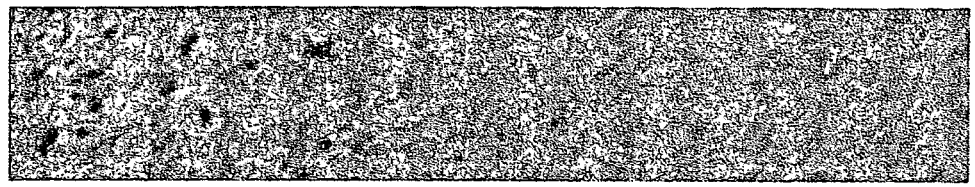
(b) FOCUS POSITION:-2μm    CALCULATED CENTER-OF-GRAVITY OF FOCAL POINT F: -46.7
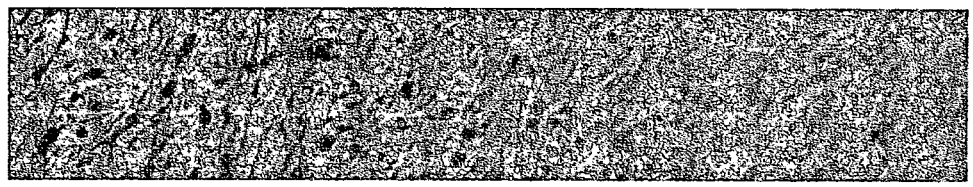
(c) FOCUS POSITION:0μm    CALCULATED CENTER-OF-GRAVITY OF FOCAL POINT F: 21.4
(d) FOCUS POSITION:2μm    CALCULATED CENTER-OF-GRAVITY OF FOCAL POINT F: 91.0
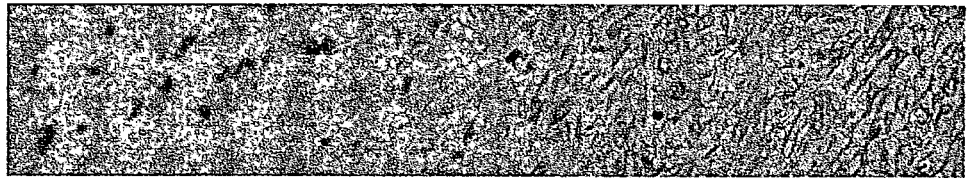
(e) FOCUS POSITION:4μm    CALCULATED CENTER-OF-GRAVITY OF FOCAL POINT F: 117.0
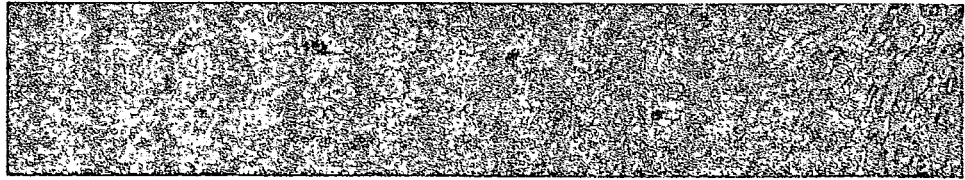

Fig.12
(a) CAMERA 1 FOCUS POSITION:-4 μm   CALCULATED CENTER-OF-GRAVITY OF FOCAL POINT F1: 5.4
(b) CAMERA 2 FOCUS POSITION:-4 μm   CALCULATED CENTER-OF-GRAVITY OF FOCAL POINT F2: 89.2
F1-F2: -83.8

Fig.13
(a) CAMERA 1 FOCUS POSITION: -2 μm   CALCULATED CENTER-OF-GRAVITY OF FOCAL POINT F1: 49.0
(b) CAMERA 2 FOCUS POSITION: -2 μm   CALCULATED CENTER-OF-GRAVITY OF FOCAL POINT F2: 55.8
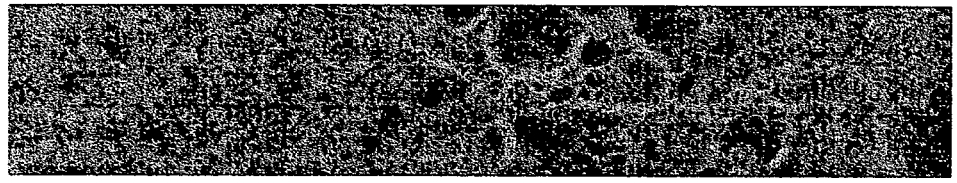
F1-F2: -6.8

Fig.14
(a) CAMERA 1 FOCUS POSITION: 0 μm   CALCULATED CENTER-OF-GRAVITY OF FOCAL POINT F1: 75.2
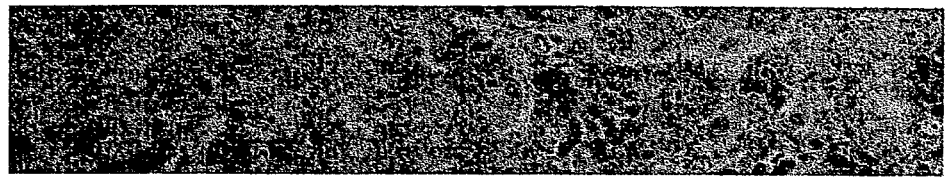
(b) CAMERA 2 FOCUS POSITION: 0 μm   CALCULATED CENTER-OF-GRAVITY OF FOCAL POINT F2: 12.0
F1-F2: 63.2

Fig.15
(a) CAMERA 1  FOCUS POSITION: 2 μm   CALCULATED CENTER-OF-GRAVITY OF FOCAL POINT F1: 94.1
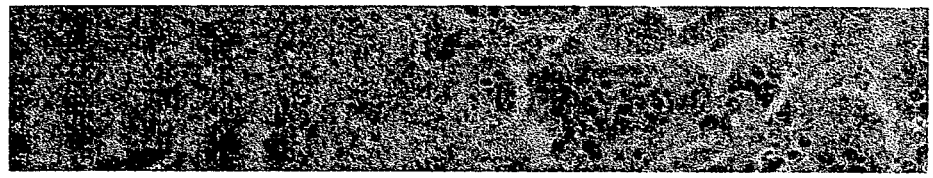
(b) CAMERA 2  FOCUS POSITION: 2 μm   CALCULATED CENTER-OF-GRAVITY OF FOCAL POINT F2: -13.4
F1-F2: 107.5

*Fig.16*
(a) CAMERA 1 FOCUS POSITION:4 μm   CALCULATED CENTER-OF-GRAVITY OF FOCAL POINT F1: 120.8
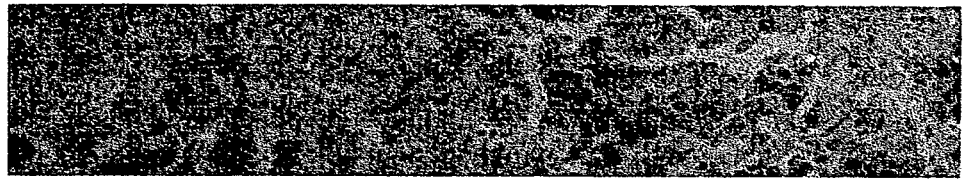
(b) CAMERA 2 FOCUS POSITION:4 μm   CALCULATED CENTER-OF-GRAVITY OF FOCAL POINT F2: -61.6
F1-F2: 182.4

*Fig.20*
(a)
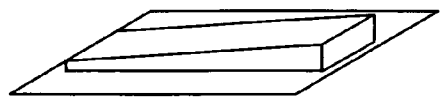
(b)
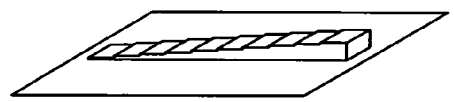
(c)
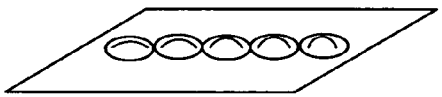
(d)
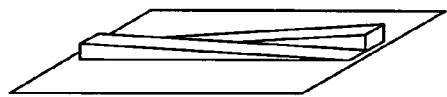
(e)
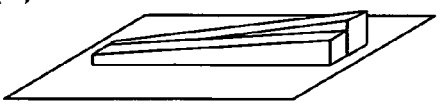
(f)
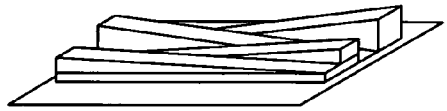

Fig.22
(a) FOCUS POSITION:-4 μm   CALCULATED CENTER-OF-GRAVITY OF FOCAL POINT F: -134.7
(b) FOCUS POSITION:-2 μm   CALCULATED CENTER-OF-GRAVITY OF FOCAL POINT F: -74.9
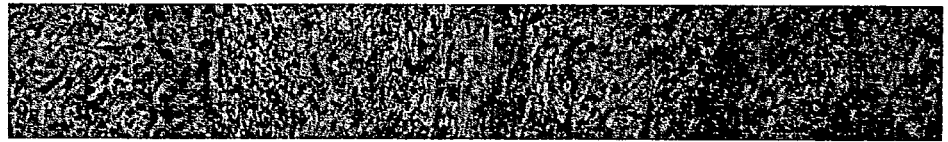
(c) FOCUS POSITION:0 μm   CALCULATED CENTER-OF-GRAVITY OF FOCAL POINT F: 29.4
(d) FOCUS POSITION:2 μm   CALCULATED CENTER-OF-GRAVITY OF FOCAL POINT F: 107.6
(e) FOCUS POSITION:4 μm   CALCULATED CENTER-OF-GRAVITY OF FOCAL POINT F: 123.4

MICROSCOPE SYSTEM

BACKGROUND OF THE INVENTION

1. Field of the Invention

The present invention relates to a microscope system used for acquiring an image of a sample.

2. Related Background of the Invention

When an image of a sample is acquired by using a microscope, a problem of deviation of the focal point occurs due to inclination of an optical system or a mechanism system in the apparatus, inclination or uneven shape of the sample itself, or the like. Under such a situation, it has been hitherto general in a conventional microscope system to carry out automatic focusing (auto-focus) for automatically controlling the focal point of image pickup of an image pickup device such as a CCD camera or the like. As the device for carrying out automatic focusing as described above are known devices described in, for example, Document 1: Japanese Patent Publication No. 3390106, Document 2: Japanese Patent Application Laid-Open No. Hei-09-230250, Document 3: Japanese Patent Application Laid-Open No. Hei-08-21961 and Document 4: Japanese Patent Application Laid-Open No. Hei-11-264937.

SUMMARY OF THE INVENTION

Of these documents, a microscope described in Document 1 uses a line sensor disposed being inclined with respect to an optical axis, and a rotatable reflection mirror disposed at the front stage of the line sensor. A laser beam is irradiated to a sample and refers to the light amount of a reflected laser beam made incident to the line sensor through the reflection mirror to control the focal point. A microscope disclosed in Document 2 uses a photosensor for detecting the light amount, and a thickness variable glass disposed at the front stage of the photosensor. As in the case of the Document 1, a laser beam is irradiated to a sample, and refers to the light amount of a reflected laser beam made incident to the photosensor through the thickness variable glass to control the focal point.

However, in these apparatus constructions, it is required to irradiate a laser beam for measuring the focal point to a sample when the focal point is controlled. Therefore, there is a problem that both of focus control for image pickup to acquire images of the sample and actual image acquisition carried out by an image pickup device in a state where no laser beam is irradiated cannot be simultaneously performed by the image pickup device.

In an automatic focusing device for a microscope disclosed in Document 3, focus control is carried out while a fixing angle varies on the basis of a vertical position perpendicular to an optical axis and an inclined position inclined at a predetermined angle in an image pickup device for acquiring images of a sample. However, in such an apparatus construction, it is required to vary the position of the image pickup device, and thus focus control for image pickup and the actual image acquisition cannot be simultaneously performed as in the case of the construction of irradiating the laser beam. Furthermore, since the position control of the image pickup device is required, the overall image pickup operation is complicated.

A microscope disclosed in Document 4 is equipped with a sensor part in an automatic focusing part, for detecting an optical image branched from an image focusing optical system. The sensor part is displaced to the front or rear side of an estimated focal point face, and the difference in contrast level between the two optical images is detected to carry out the focusing. However, in such an apparatus construction, the sensor part must be moved to acquire two optical images, and thus the apparatus construction and the image pickup operation are complicated. Furthermore, if the optical image of the sample is taken in before the optical path length between the sample and the sensor part has not yet fixed when the sensor part is moved, the optical image is blurred. Therefore, a standby time is required until the optical path length is been fixed. Accordingly, there is a problem that the focusing and the image acquisition of the sample cannot be performed in a short time.

The present invention has been implemented to solve the above problems, and has an object to provide a microscope system which can simultaneously perform image acquisition of a sample and focus control for image pickup.

In order to achieve the above object, a microscope system according to the present invention comprises (1) a light guiding optical system containing optical splitting means for splitting an optical image of a sample into a first optical path for image acquisition and a second optical path for focus control, (2) first image pickup means which is disposed on the first optical path and used to acquire a one-dimensional or two-dimensional first image based on an optical image split to the first optical path, (3) second image pickup means which is disposed on the second optical path so that an optical path length in the light guiding optical system varies along a predetermined variation direction on the image pickup face thereof and used to acquire a two-dimensional second image for focus control based on an optical image split to the second optical path, (4) focus control means for analyzing the second image acquired by the second image pickup means and controlling the focal point for image pickup of the first image pickup means on the basis of the analysis result, and (5) image acquisition control means for controlling acquisition of the first image acquired by the first image pickup means.

In the microscope system described above, two image pickup means of the first image pickup means and the second image pickup means are equipped for a sample targeted to acquire an image. Accordingly, the actual image acquisition by the first image pickup means and the image acquisition for focus control by the second image pickup means can be separately performed. With such a construction, for example, the image acquisition of the sample and focus control for image pickup can be simultaneously performed.

Furthermore, in the above described system, as second image pickup means used for focus control, not only is image pickup means which can acquire a two-dimensional image used, but also the image pickup means is disposed so that image pickup is in a condition where the optical path length from which an optical image of the sample is guided is changed in a predetermined direction. With the construction in which focus control is carried out by analyzing the two-dimensional image thus acquired by using the image pickup means, a laser beam for focus measurement of a sample is not required. Accordingly, both the image acquisition of a sample and focus control for image pickup can be suitably performed at the same time. The image acquisition control means may further control the setting of the image pickup position to the sample.

Here, with respect to the specific construction of the second image pickup means for acquiring images for focus control, the second image pickup means may be designed to have an image pickup device in which the image pickup face thereof is disposed so as to be inclined with respect to the second optical path at a predetermined angle so that the optical path length varies along the variation direction. According to the construction as described above, the image acquisition for focus control can be suitably performed.

Alternatively, the second image pickup means may be designed to have an image pickup device and optical path length changing means which is set at a predetermined position with respect to the image pickup face of the image pickup device so that the optical path length varies along the variation direction. With the construction described above, the image acquisition for focus control can be also suitably performed. As the optical path length changing means, for example, an optical path length changing member may be used for transmitting therethrough light which is formed in a wedge shape having a predetermined slope.

In this case, the second image pickup means may be designed to have one optical path length changing means which is disposed as optical path length changing means at a predetermined position with respect to one image pickup area of the image pickup face of the image pickup device so that the optical path length varies along the variation direction, and another optical path length changing means which is disposed at a predetermined position with respect to another image pickup area of the image pickup face of the image pickup device so that the optical path length varies along the variation direction and at a variation rate different from the one optical path length changing means. In the construction described above, it is preferable that the optical path lengths of the two optical path length changing means vary in opposite directions to each other, whereby the precision of focus control can be enhanced.

The second image pickup means may be designed to have two image pickup devices, one image pickup device being disposed so that the optical path length varies along the variation direction within the image pickup face, and another image pickup device being disposed so that the optical path length varies along the variation direction within the image pickup face and at a variation rate different from the one image pickup device. In the construction described above, it is preferable that the optical path lengths of the two image pickup devices vary in opposite directions to each other, whereby the precision of focus control can be enhanced.

Furthermore, a microscope system may be designed to have a first image forming lens disposed on the first optical path, and a second image forming lens disposed on the second optical path, wherein the second image forming lens has an image forming magnification smaller than that of the first image forming lens. Accordingly, the acquisition of the first image on the first optical path and the acquisition of the second image on the second optical path can be suitably performed.

With respect to focus control using the second image acquired by the second image pickup means, it is preferable that the focus control means analyzes the image contrast variation in the variation direction in the second image and controls the focal point for image pickup on the basis of the analysis result. Accordingly, the image pickup focus control using the two-dimensional image based on the optical image of the sample can be implemented with high precision.

In this case, specifically, it is preferable that the focus control means cuts out a measurement target image having a predetermined width along the variation direction from the second image and analyzes the image contrast variation on the basis of a differential absolute value image between the measurement target image and a shift image acquired by shifting the measurement target image in the direction vertical to the variation direction.

Furthermore, it is preferable that the focus control means judges whether the second image is applicable to the control of the focal point for image pickup, and if it is judged that the second image is applicable, the focus control means analyzes the second image and controls the image pickup focal point on the basis of the analysis result. Accordingly, focus control can be prevented from being carried out by using an improper image, and focus control for image pickup can be suitably performed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 7 is a figure including images showing examples of a measurement target image used for focus control.

FIG. 12 is a figure including images showing examples of a measurement target image used for focus control.

FIG. 13 is a figure including images showing examples of a measurement target image used for focus control.

FIG. 14 is a figure including images showing examples of a measurement target image used for focus control.

FIG. 15 is a figure including images showing examples of a measurement target image used for focus control.

FIG. 16 is a figure including images showing examples of a measurement target image used for focus control.

FIG. 20 is a figure including perspective views showing examples of the construction of an optical path length changing member.

FIG. 22 is a figure including images showing examples of a measurement target image used for focus control.

DESCRIPTION OF THE PREFERRED EMBODIMENTS

Figure 1:
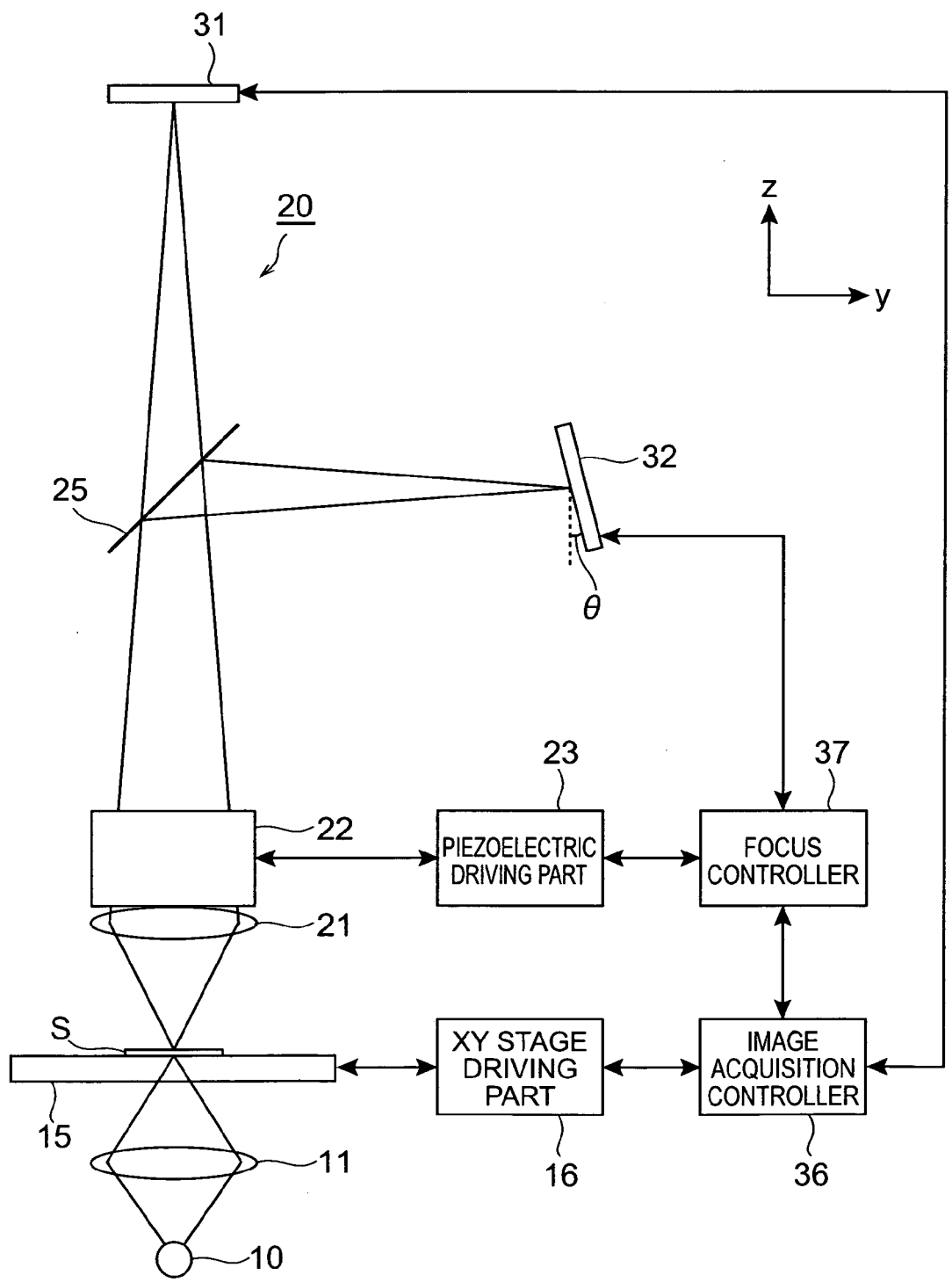
FIG. 1 is a block diagram showing the construction of a first embodiment of a microscope system.

Preferred embodiments of a microscope system according to the present invention will be described below in detail with reference to the drawings. In the description of drawings the same elements will be denoted by the same reference symbols, without redundant description. It is also noted that dimensional ratios in the drawings do not always agree with those in the description.

FIG. 1 is a block diagram showing the construction of a first embodiment of a microscope system according to the present invention. The microscope system is designed as a transmission type microscope used to acquire an image of a sample S. The sample S targeted to acquire an image is, for example, a living organism sample, and it is placed on a sample stage 15.

The sample stage 15 comprises an XY stage movable in the x-direction and y-direction (horizontal directions), and an image pickup position to the sample S is set or changed by driving the XY stage 15 on the xy plane. The sample stage 15 is controlled by an XY stage driving part 16. At the lower side of the sample stage 15 are disposed an irradiation light source 10 for irradiating the sample S with light for generating an optical image which is a target for image pickup and a light converging lens 11 for converging the light from the irradiation light source 10 to the image pickup position set for the sample S.

A light guiding optical system 20 for guiding the optical image of the sample S is equipped above the sample stage 15 with respect to the sample S on the sample stage 15 irradiated with light from the irradiation light source 10. In this embodiment, the light guiding optical system 20 has an objective lens 21 to which the light from the sample S is made incident, and a beam splitter 25 disposed at the rear stage of the objective lens 21. The beam splitter 25 is optical splitting means for splitting the optical image of the sample S to two optical paths of a first optical path and a second optical path.

In FIG. 1, an optical path on which light from the objective lens 21 passes through the beam splitter 25 is set to the first optical path used to acquire an image of the sample S. Furthermore, an optical path in which the light from the objective lens 21 is reflected from the beam splitter 25 is set to the second optical path used to control the focal point for image pickup. The beam splitter 25 is disposed at an angle of about 45° with respect to the first optical path, and the second optical path is substantially perpendicular to the first optical path. Here, for convenience of description, a direction which is an optical axis direction of a microscope optical system containing the irradiation light source 10 and the objective lens 21 and along the first optical path is set to the z-axis direction, a direction which is perpendicular to the first optical path and along the second optical path is set to the y-axis direction, and a direction which is perpendicular to the y-axis and the z-axis is set to the x-axis direction.

A piezoelectric actuator 22 is equipped for the objective lens 21. The piezoelectric actuator 22 is objective lens driving means for driving the objective lens 21 in the z-axis direction (vertical direction, optical axis direction). The driving of the piezoelectric actuator 22 is controlled by a piezoelectric driving part 23. In the microscope system of this embodiment, the focal point of the image pickup to acquire an image of the sample S can be adjusted by varying the position of the objective lens 21 in the z-axis direction by using the piezoelectric actuator 22.

A photodetector 31 is disposed on the first optical path at the position corresponding to the image forming plane of the optical image of the sample S which passed through the beam splitter 25. The photodetector 31 is first image pickup means used to acquire an image (first image) based on an optical image which is split to the first optical path for the image acquisition by the beam splitter 25. As the photodetector 31 specifically is used a linear sensor which can acquire a one-dimensional image of the sample S or an image sensor which can acquire a two-dimensional image.

An image pickup device 32 is disposed on the second optical path at the position corresponding to the image forming plane of the optical image of the sample S which is reflected from the beam splitter 25. The image pickup device 32 comprises a CCD camera which can acquire a two-dimensional image, and it is a second image pickup means for acquiring an image (second image) based on the optical image split to the second optical path for focus control by the beam splitter 25. In the microscope system shown in FIG. 1, focus control of the image pickup is performed by using the two-dimensional image of the sample S acquired by the CCD camera 32.

Specifically, the CCD camera 32 is set up in a state where the image pickup face thereof is substantially coincident with the xz plane perpendicular to the second optical path and inclined with respect to the second optical path at an angle of θ with the z-axis direction set as an inclination direction. At this time, on the image pickup face of the CCD camera 32, the optical path length in the light guiding optical system 20 for which light is guided from the sample S to the CCD camera 32 varies along the z-axis direction as the variation direction.

An image acquisition controller 36 and a focus controller 37 are equipped for the sample stage 15, the light guiding optical system 20, the photodetector 31 and the CCD camera 32. The image acquisition controller 36 is control means for controlling the image acquiring operation of the sample S by controlling the acquisition of the image of the sample S and the setting of the image pickup position to the sample S. Specifically, the image acquisition controller 36 controls the acquisition of the image by the photodetector 31. Furthermore, the controller 36 controls the driving of the sample stage 15 through the XY stage driving part 16 to set or vary the image pickup position on the optical axis of the microscope optical system for the sample S mounted on the sample stage 15.

Focus controller 37 analyzes an image acquired by the CCD camera 32 according to a predetermined analyzing method. The focal point for image pickup by the photodetector 31 is controlled on the basis of the analysis result. In this embodiment, focus controller 37 controls the driving of the piezoelectric actuator 22 through the piezoelectric driving part 23, and adjusts the position of the objective lens 21 in the z-axis direction to perform focus control for image pickup.

Here, the CCD camera 32 serving as the image pickup device for focus control is disposed being inclined with respect to the optical axis of the second optical path as described above. Therefore, a two-dimensional image acquired by the CCD camera 32 is an image in which deviation from the focus position varies along the z-axis direction. The image in which the deviation from the focus position varies along a predetermined variation direction as described above is analyzed in focus controller 37, thereby acquiring focus control information, such as deviation of the focal point for image pickup, necessity or non-necessity of focusing, a correction amount required to match the focal point, etc.

Figure 2:
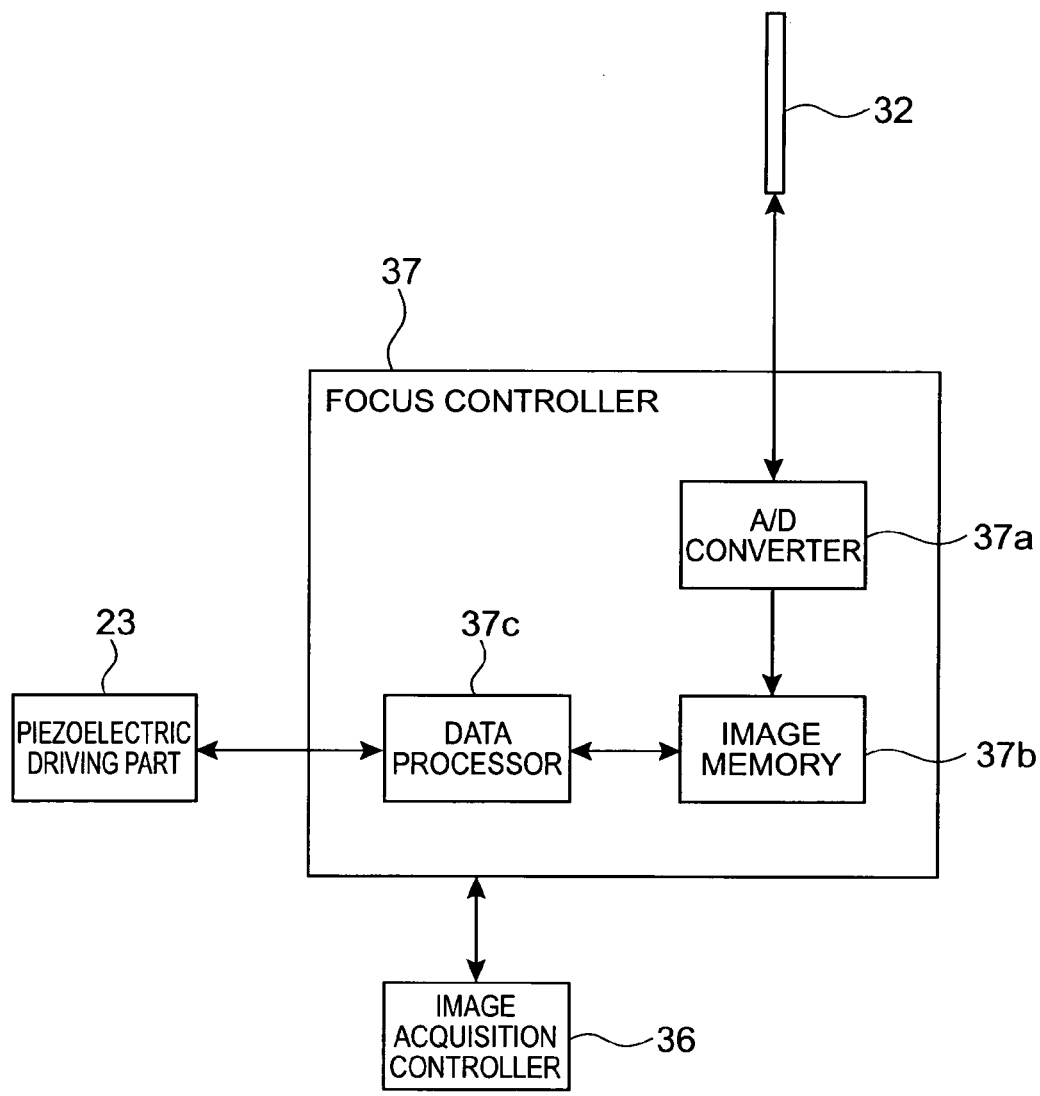
FIG. 2 is a block diagram showing an example of the construction of a focus controller.

FIG. 2 is a block diagram showing an example of the specific construction of focus controller 37. In this embodiment, focus controller 37 comprises an A/D converter 37a, an image memory 37b and a data processor 37c. A data signal of an image acquired by the CCD camera 32 is subjected to A/D conversion in the A/D converter 37a, and then stored as image data for focus control in the image memory 37b. The data processor 37c reads out required image data from the image memory 37b to analyze the image data thus read out, and also controls the piezoelectric driving part 23 on the basis of the analysis result.

The effect of the microscope system according to this embodiment will be described.

In the microscope system shown in FIG. 1, the two image pickup means of the photodetector 31 serving as the first image pickup means and the CCD camera 32 serving as the second image pickup means are equipped for the sample S targeted to acquire an image. Accordingly, the actual image acquisition by the photodetector 31 and the image acquisition for focus control by the CCD camera 32 can be separately performed from each other. In the construction as described above, for example, the image acquisition of the sample S and focus control for image pickup can be simultaneously performed. That is, an image of the sample S is acquired through the photodetector 31 by the image acquisition controller 36 while the focal point is automatically controlled by focus controller 37 by referring to the image acquired by the CCD camera 32.

Furthermore, in the system as described above, the CCD camera 32 which can acquire a two-dimensional image is used as the second image pickup device used for focus control, and the camera 32 is disposed being inclined with respect to the optical axis so as to satisfy such an image pickup condition where an optical path length at which an optical image is guided from the sample S varies in the z-axis direction. According to the construction where the two-dimensional image acquired by the camera 32 as described above is analyzed and focus control is carried out, irradiation of a laser beam for measurement of the focal point to the sample S is unnecessary. Accordingly, both the image acquisition of the sample S and focus control for image pickup can be suitably performed.

As described above, a real-time focus technique for carrying out focus control using a two-dimensional image of the sample S acquired by the CCD camera 32 on a real-time basis while an image of the sample S is acquired by the photodetector 31 is effective to increase the speed of the image acquiring work of the sample S. For example, development of a virtual slide in which the overall living organism sample is computerized as image data has been recently promoted, and in order to carry out the computerization of such a sample at high speed, real-time focus control is very important.

In the above embodiment, focus control from the sample S to the photodetector 31 is carried out by controlling the driving of the piezoelectric actuator 22 and adjusting the position of the objective lens 21 in the z-axis direction. Accordingly, the feedback control of the focal point using the image acquired by the CCD camera 32 can be surely performed at high speed. However, for such a focus control, not only a construction for driving the objective lens 21, but also a construction, for example, for driving in the z-axis direction the sample stage 15 on which the sample S is placed can be used. Furthermore, in place of the piezoelectric actuator, a stepping motor or the like may be used as the driving mechanism for driving the objective lens 21 or the sample stage 15.

Furthermore, with respect to the second image pickup device for acquiring a two-dimensional image of the sample S used for focus control, other image pickup devices which can acquire two-dimensional images, such as a CMOS type image pickup device or the like, may be used in place of the CCD camera.

Figure 3:
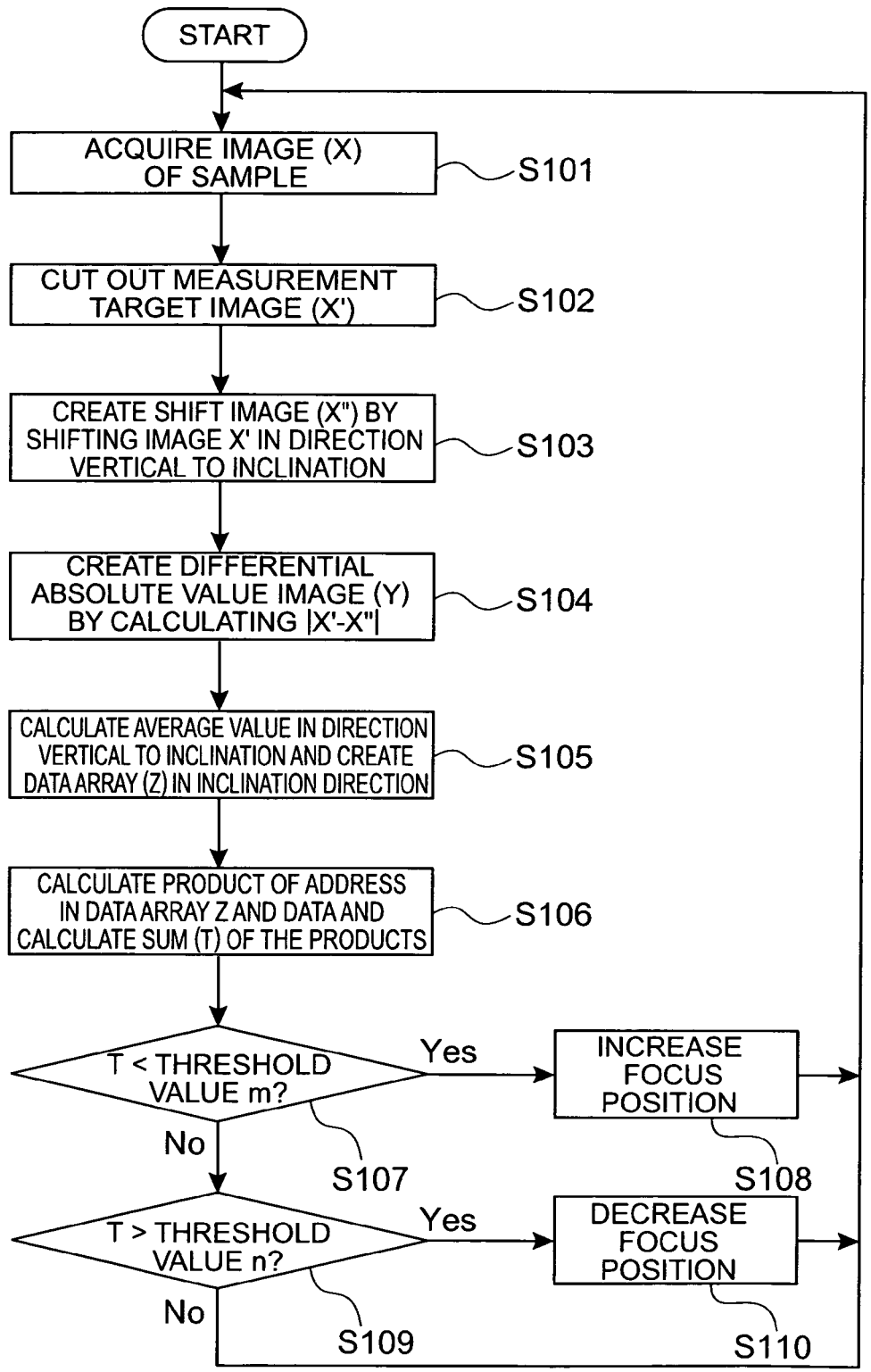
FIG. 3 is a flowchart showing an example of a focus control method.
Figure 4:
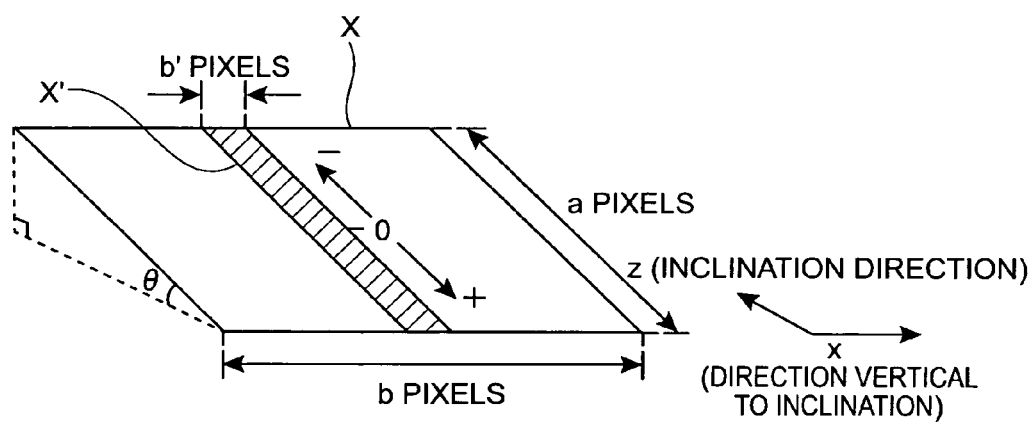
FIG. 4 is a schematic diagram showing the focus control method shown in FIG. 3.

The focus control method for the microscope system shown in FIG. 1 will be described. FIG. 3 is a flowchart showing an example of the focus control method. FIG. 4 is a schematic diagram showing the focus control method shown in FIG. 3. Focus control described below is carried out by focus controller 37 constructed as shown in FIG. 1.

In the control method, as shown in FIG. 4, a two-dimensional image X comprising a pixels×b pixels is acquired by the CCD camera 32 (step S101). The a pixels are located in the z-axis direction corresponding to the inclination direction of the image pickup face while the b pixels are located in the x-axis direction vertical to the inclination. Then, a measurement target image X' which comprises the full width (a pixels) in the inclination direction and a fixed width (b' pixels) in the direction vertical to the inclination and also is along the inclination direction are cut out from the image X (S102).

Subsequently, with respect to the measurement target image X' thus cut out, a shift image X" is created by shifting the measurement target image X' by fixed pixels (s pixels) in the direction vertical to the inclination (S103). The difference (X'−X") between the image X" and the image X' is calculated, and further the absolute value thereof |X'−X"| is calculated to create the differential absolute value image Y (S104). The differential image Y thus acquired becomes an image of a x (b'−s) pixels because pixels by the number of which the measurement target image X' is shifted are invalid. Here, with respect to the number s of pixels for shifting the measurement target image X', a suitable pixel number is preferably selected in consideration of the optical magnification and the numerical aperture NA of the objective lens.

Subsequently, with respect to the differential absolute value image Y, an average value is calculated on the basis of b'−s pixels in the direction vertical to the inclination, and a data array Z of the a pixels in the inclination direction is created (S105). The differential absolute value image Y and the data array Z averaged in the direction vertical to the inclination corresponds to the absolute value of a differential value of the image component at each position of the measurement target image X' along the inclination direction.

When the contrast pattern of the sample S targeted to acquire an image is uniform, in an image acquired by the camera 32, the contrast becomes larger as the focal point is matched. Furthermore, when the image contrast is large, the absolute value of the differential value of the corresponding image component is increased. Accordingly, information on focus control is acquired by carrying out analysis to determine variation of the data value corresponding to the contrast variation of the image in the inclination direction for the data array Z. By referring to the analysis result, focus control of image pickup can be suitably performed.

In FIG. 3, specifically, with respect to each data of the data array Z, addresses are allocated to the data at the respective positions on the assumption that the address of the center position along the inclination direction is set to 0, the address of each position in the plus direction of the z-axis which is inclined forward is set to −, and the address of each position in the minus direction of the z-axis which is inclined rearward is set to + as shown in FIG. 4. The product between each address in the data array Z and the data thereof is calculated, and the sum T of the products is calculated (S106).

With respect to the sum T thus calculated, when the sum T is a negative value, the present focus position is located at a nearer position than the correct focus position, and as the absolute value thereof is larger, the displacement of the focus position from the correct focus position is larger. On the other hand, when the sum T is a positive value, the present focus position is located at a farther position than the correct focus position, and as the absolute value thereof is larger, the displacement of the focus position from the correct focus position is larger. Accordingly, if focus control is carried out by referring to the sum T as described above, the actual focus position can be approached to the correct focus position.

As a specific control method, for example, a negative-side threshold value m and a positive-side threshold value n are set for the sum T, and if the sum T is out of the range between the threshold values m and n, the focus position is adjusted. According to this method, as shown in FIG. 3, it is judged whether the sum T is smaller than the negative threshold value m (T<threshold value m) (S107). If the sum T is smaller than the threshold value m, focus control is carried out so as to increase the focus position (S108). It is judged whether the sum T is larger than the positive threshold value n (T>threshold value n) (S109). If the sum T is larger than the threshold value n, focus control is carried out so as to decrease the focus position (S110).

Focus control operation of the above steps S101 to S110 is repeated by scanning the image pickup position of the sample S, whereby an image of the sample S can be acquired at high speed with excellent image quality.

In the focus control method described above, creation of the data array Z is carried out for every pixel. However, the specific creating method of the data array Z is not limited to the above method. For example, the data array Z may be created by carrying out thinning-out processing every a plurality of pixels by sampling. According to this method, the speed of focus control can be further increased.

Various other methods may be used in place of the focus control method described above.

Figure 5:
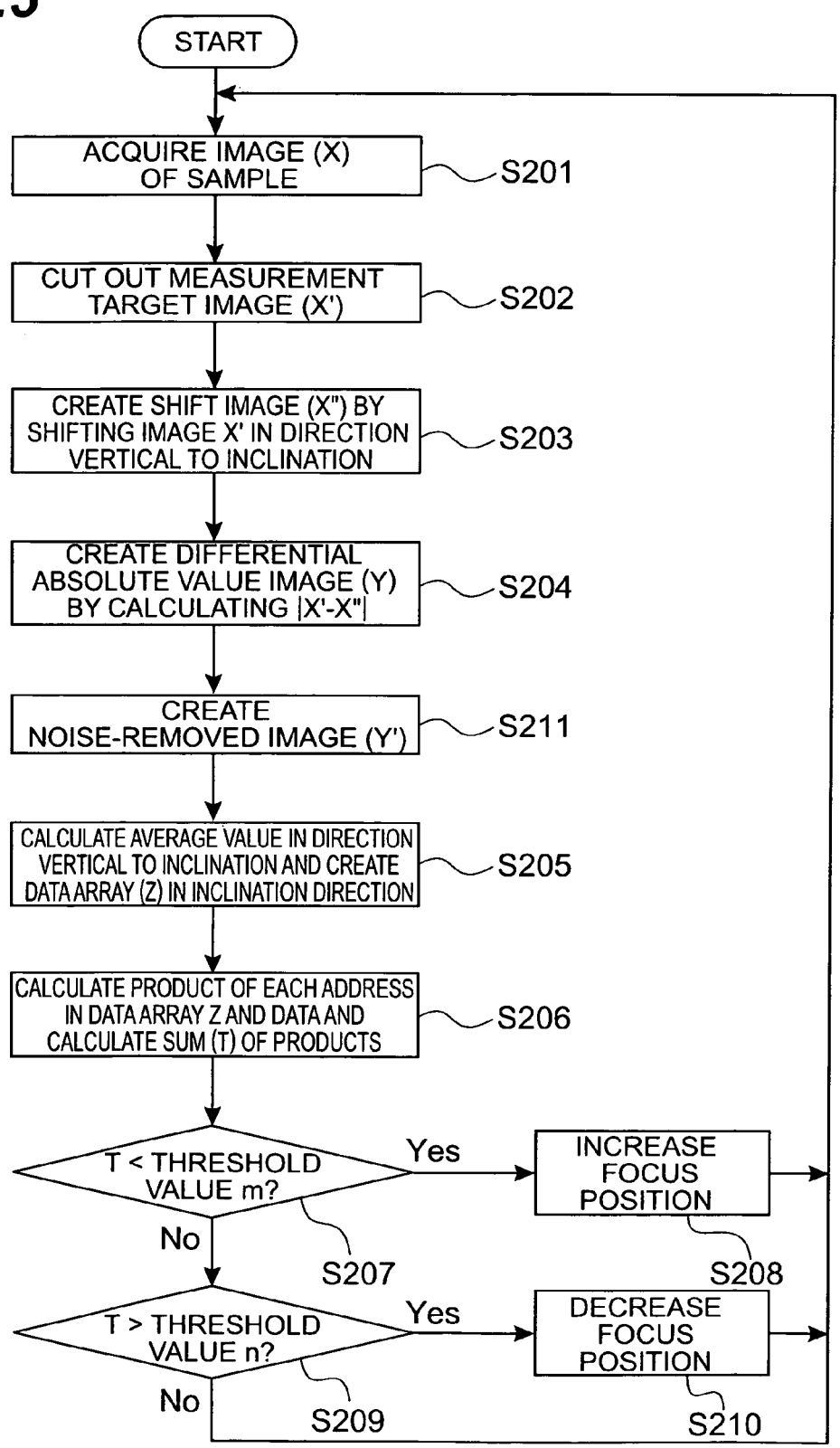
FIG. 5 is a flowchart showing another example of a focus control method.

FIG. 5 is a flowchart showing another example of the focus control method. In this control method, the steps S201 to S210 are the same as the steps S101 to S110 of the control method of FIG. 3.

In this control method, a step S211 for removing noise is equipped between a step S204 for creating a differential absolute value image Y and a step S205 for creating a data array Z in the inclination direction. In this case, in order to remove an effect of image noise in the differential absolute value image Y on focus control, a noise level p is set to the data value of each pixel.

In the respective pixels of the differential absolute value image Y, if the data value of some pixel is smaller than the noise level p, the data value of the pixel concerned is set to zero as noise data, and a differential absolute value image Y' from which the noise is removed is created (S211). The data array Z in the inclination direction is created by using the noise-removed image Y'. Accordingly, the effect imposed on focus control by noises caused by the light guiding optical system 20 and the CCD camera 32 can be suppressed.

Figure 6:
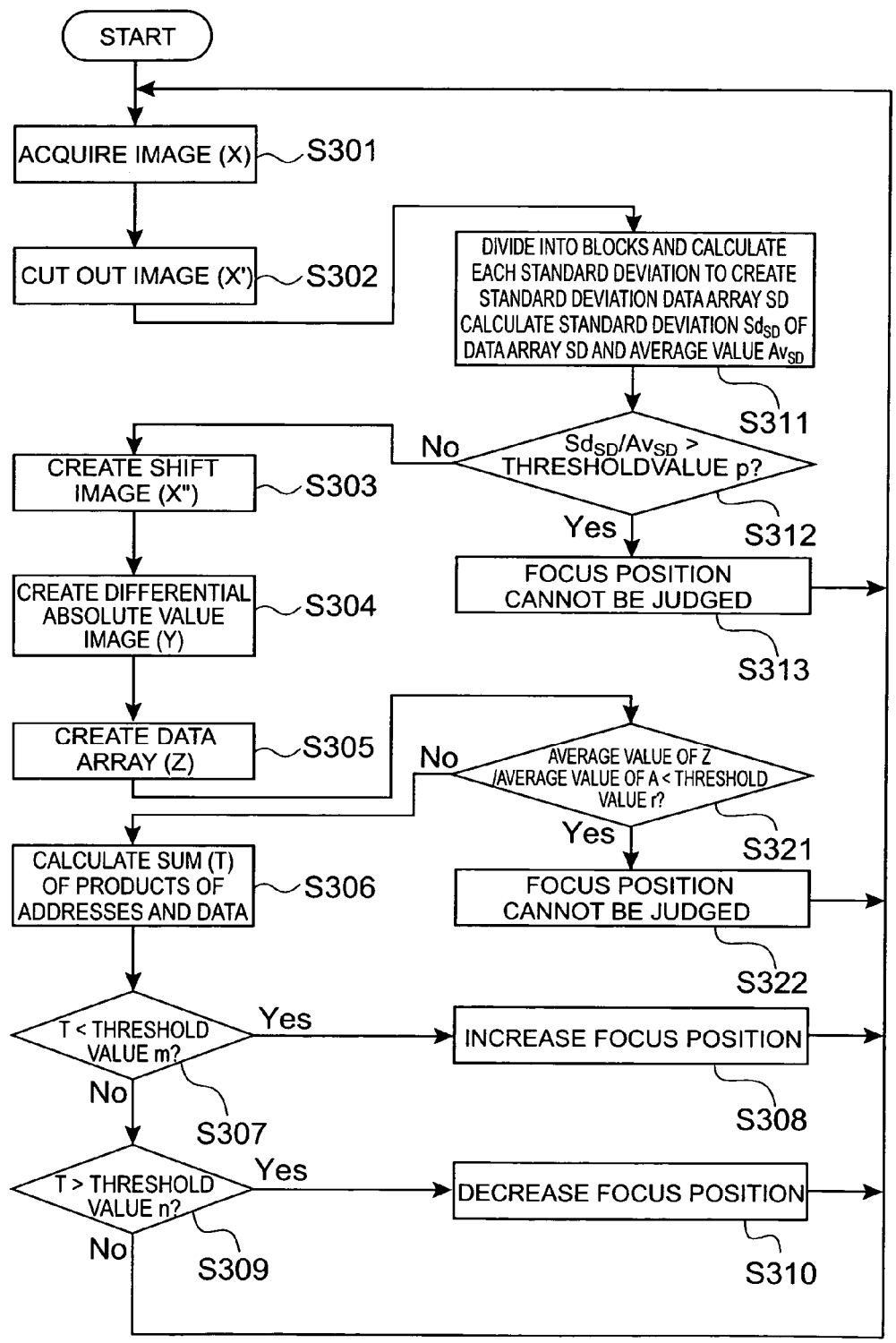
FIG. 6 is a flowchart showing another example of a focus control method.

FIG. 6 is a flowchart showing another example of the focus control method. In this control method, the steps S301 to S310 are the same as the steps S101 to S110 in the control method of FIG. 3.

In this control method, focus controller 37 judges whether the image acquired by the CCD camera 32 is applicable to the control of the image pickup focal point. If it is judged to be applicable, the image is analyzed and the focal point for the image pickup is controlled on the basis of the analysis result.

Specifically, steps S311 to S313 are added between the step S302 of cutting out the measurement target image X' and the step S303 of creating the shift image X". In this case, with respect to the measurement target image X', the image X' is divided into blocks, and the standard deviations of the respective blocks are calculated to create a standard deviation data array SD. A standard deviation $Sd_{SD}$ and an average value $Av_{SD}$ are calculated from the standard deviation data array SD (S311), and it is judged whether the ratio $Sd_{SD}/Av_{SD}$ between the standard deviation and the average value is larger than the threshold value p ($Sd_{SD}/Av_{SD}$>threshold value p) (S312). If it is larger than the threshold value p, the contrast of the sample S itself is non-uniform, and thus it is judged that the focus position cannot be judged (S313), so that focus control is not carried out.

Furthermore, steps S321 and S322 are added between the step S305 of creating the data array Z in the inclination direction and the step S306 of calculating the sum T of the products of the addresses in the data array Z and the data thereof. In this case, with respect to the measurement target image X', an average value is calculated by b' pixels in the direction vertical to the inclination, and a data array A with the a pixels in the inclination direction is created. In addition, it is judged whether the average value of the data array Z/the average value of the data array A (corresponds to variation amount/brightness, that is, contrast) is smaller than the threshold value r (average value of Z/average value of A<threshold value r) (S321). If it is smaller than the threshold value r, the sample S does not exist at the image pickup position, or the focal point is greatly deviated. Therefore, it is judged that the focus position cannot be judged (S322), and thus focus control is not carried out.

As described above, with respect to the image acquired by the CCD camera 32, after it is judged whether the image is suitable for focus control, the analysis of the image and focus control are carried out, whereby focus control can be prevented from being carried out by using an improper image, and focus control for image pickup can be suitably performed.

In each of the focus control methods as described above, the analysis of the contrast variation of the image for focus control is carried out by using the differential absolute value image between the measurement target image cut out by a predetermined width along the inclination direction of the image pickup face and the shift image of the measurement target image. By using the method as described above, the contrast variation of the image can be surely analyzed by using an easy method. With respect to the specific analyzing method of the contrast, methods other than described above may be used.

In the focus control method, the data arrays A and Z are created for every pixel, however, the specific creating method of the data arrays is not limited to the above method. For example, the thinning-out processing based on the sampling for every a plurality of pixels may be carried out to create each data array. Such a method can further increase the speed of focus control.

In the method shown in FIG. 6, the block dividing the image X' in the steps S311 and S312 is not limited to a two-dimensional matrix division, but it may be a one-direction block-division. Furthermore, with respect to the size of the blocks, a suitable size is preferably set in consideration of optical magnification, the size of the CCD camera, the number of pixels, etc.

Furthermore, in the above method, in the steps S313 and S322, when a target image is not a uniform contrast pattern or when a sample S exists at only a part of an image and thus a sufficient contrast level is not obtained, it is judged that the focus position cannot be specified, and thus focus control is not carried out. On the other hand, when the stage 15 is driven to successively acquire images of the sample S, focus control information concerning an image pickup position at which the focus position cannot be judged may be set by referring to focus control information concerning another image pickup position. In this case, for example, focus control may be carried out under the state where focus control information concerning the image pickup position at which the focus position cannot be judged is regarded as any focus control information acquired through a series of focus measurements and stored in the data storage part or as the same as the closest (latest) focus control information.

With respect to focus control using the image acquired by the CCD camera 32, focus control for image pickup can be implemented with high precision by using the method of analyzing the contrast variation of the image. However, methods other than the method of using the contrast variation may be used as the focus control method.

An example of the focus control method using the microscope system described above will be described.

In this example, a pathological sample of leiomyosarcoma is used as a sample S. This pathological sample is set in a microscope (NIKONTMD, 20×, NA0.75), and a CCD camera (ORCA, produced by Hamamatsu Photonics K. K.) is disposed at an inclination angle of $\theta=25°$. At this time, both ends of the image pickup face of the CCD in the inclination direction have a depth of about 3.7 mm in the optical axis direction. This is equivalent to about 9 μm in terms of the depth on the sample because variation in the optical axis direction on the sample S is equal to the square of magnification on the image pickup face.

In the image for focus control acquired by the CCD camera, the size of the measurement target image X' was set to a x b'=1024 pixels×190 pixels, and the focus measurement was carried out at five points at which the deviation of the focus position from the correct focus position is −4 μm, −2 μm, 0 μm, 2 μm, and 4 μm.

FIG. 7 is a figure including images showing examples of the measurement target images used for focus control. Images (a) to (e) of FIG. 7 correspond to measurement target images X' acquired when the deviation of the focus position is (a) −4 μm, (b) −2 μm, (c) 0 μm, (d) 2 μm and (e) 4 μm, respectively. Shift images X" are created by shifting the measurement target images X' by four pixels, and the differential absolute value images Y and the data array Z are determined from the images X' and X". Then, the data F of the center of gravity of the focal point which corresponds to the sum T of the products of the addresses of the data array Z and the data is determined.

Figure 8:
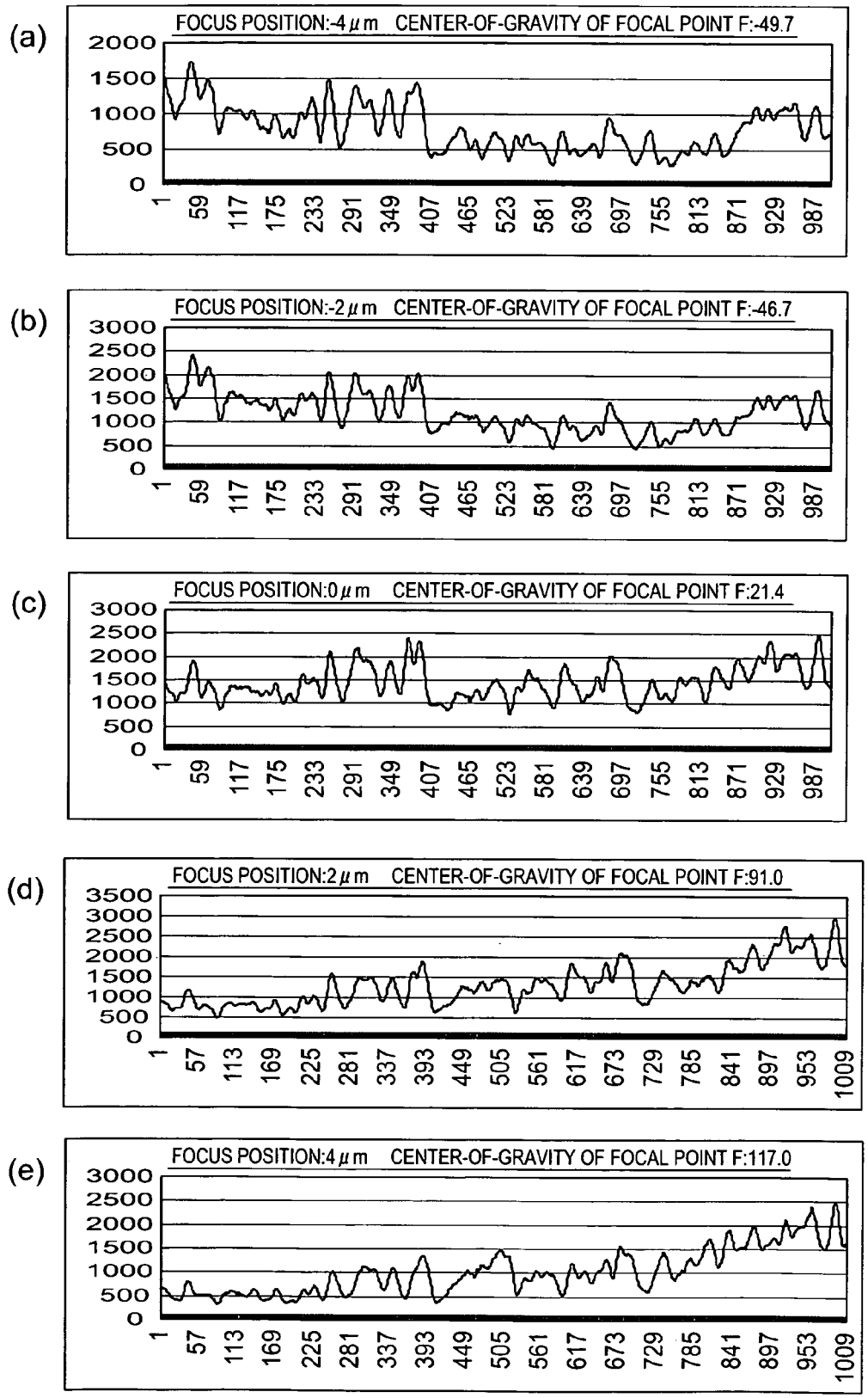
FIG. 8 is a figure including graphs showing contrast variations in the measurement target images shown in FIG. 7.

FIG. 8 is a figure including graphs showing the contrast variations in the measurement target images shown in FIG. 7. In the graphs (a) to (e) of FIG. 8, the abscissa axis represents the pixel position in the inclination direction, and the ordinate axis represents the data array Z corresponding to the contrast at each position. Furthermore, the graphs (a) to (e) of FIG. 8 correspond to the images (a) to (e) of FIG. 7, respectively.

From these data array Z, the center of gravity of the focal point F (sum T) with respect to the respective focus positions is calculated as (a) F=−49.7 for the focus position −4 μm, (b) F=−46.7 for the focus position −2 μm, (c) F=21.4 for the focus position 0 μm, (d) F=91.0 for the focus position 2 μm and (e) F=117.0 for the focus position 4 μm. As is apparent from the result that in the analysis result acquired by the analyzing method described above, the deviation of the focus position and the variation of the value of the center of gravity of focal point F calculated from the data array Z are well associated with each other. Accordingly, by referring to the analysis result as described above, focus control for image pickup can be suitably performed.

Figure 9:
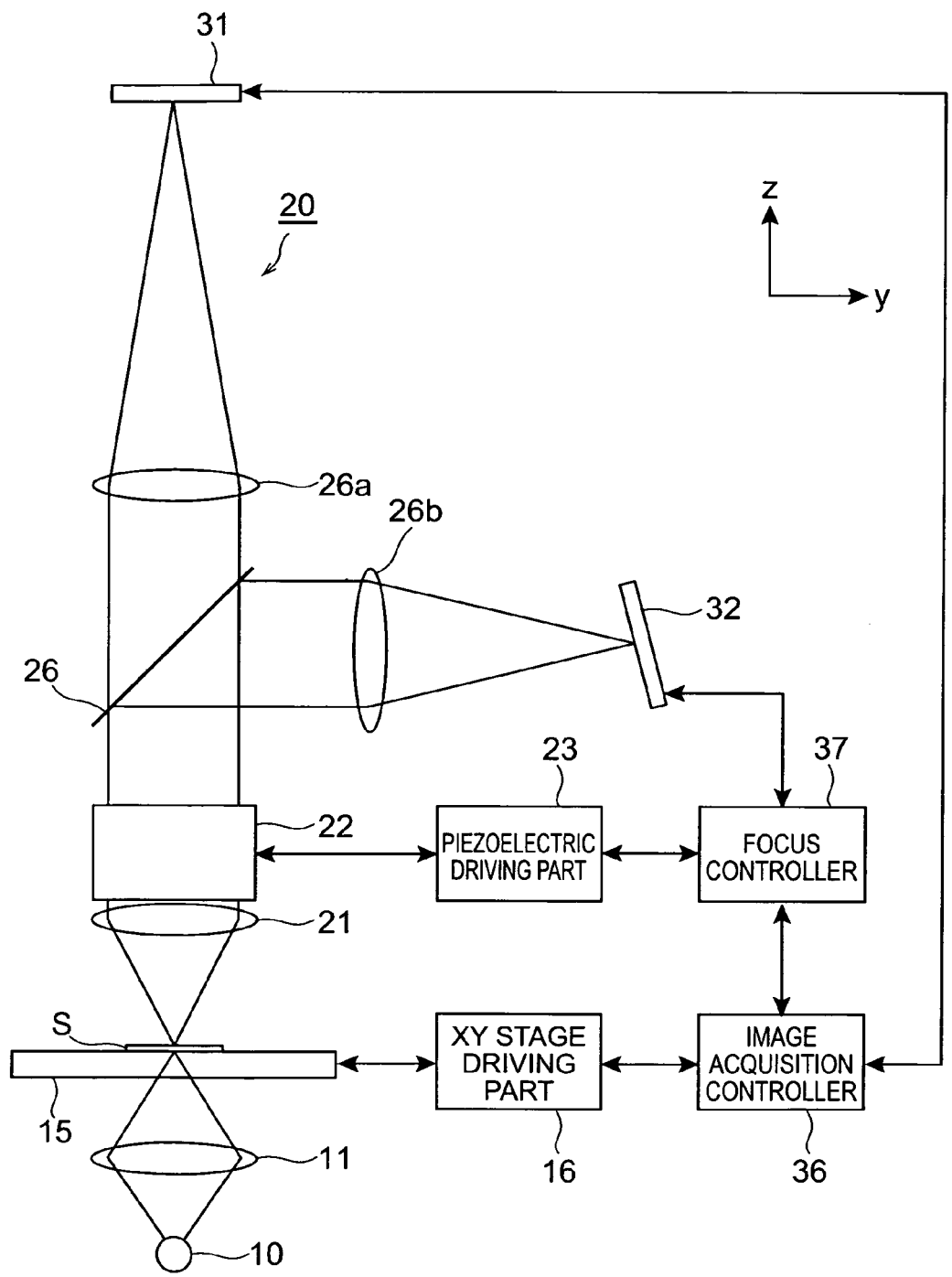
FIG. 9 is a block diagram showing the construction of a second embodiment of a microscope system.

FIG. 9 is a block diagram showing the construction of a second embodiment of the microscope system according to the present invention. In this embodiment, the irradiation light source 10, the light converging lens 11, the sample stage 15, the XY stage driving part 16, the piezoelectric driving part 23, the image acquisition controller 36 and focus controller 37 are the same as the first embodiment shown in FIG. 1.

The light guiding optical system 20 is equipped above the sample stage 15 with respect to the sample S on the sample stage 15. In this embodiment, the light guiding optical system 20 has an objective lens 21, a beam splitter 26 and image forming lenses 26*a* and 26*b*. A piezoelectric actuator 22 for driving the objective lens 21 in the z-axis direction is equipped for the objective lens 21.

A photodetector 31 serving as first image pickup means is disposed on the optical path on which light from the objective lens 21 passes through the beam splitter 26. Furthermore, a CCD camera 32 being inclined to the optical path serving as second image pickup means is disposed on the optical path to which the light from the objective lens 21 is reflected by the beam splitter 26.

In FIG. 9, the optical path from the objective lens 21 to the beam splitter 26 is an infinite optical path. In corresponding to this, a first image forming lens 26*a* for forming an optical image onto the photodetector 31 is disposed between the beam splitter 26 and the photodetector 31. Furthermore, a second image forming lens 26*b* for forming an optical image on the camera 32 is disposed between the beam splitter 26 and the CCD camera 32.

In this construction, the magnification of the image formation on the photodetector 31 for image acquisition and the magnification of the image formation on the CCD camera 32 for focus control can be separately set by the lenses 26*a* and 26*b*. Accordingly, the image formation magnification onto the camera 32 can be set to a magnification suitable for the focus measurement without affecting the image acquisition of the sample S. In this case, with respect to the first image forming lens 26a disposed on the first optical path for image acquisition and the second image forming lens 26b disposed on the second optical path for focus control, it is preferable that the second image forming lens 26b has a smaller image forming magnification than the first image forming lens 26a.

Figure 10:
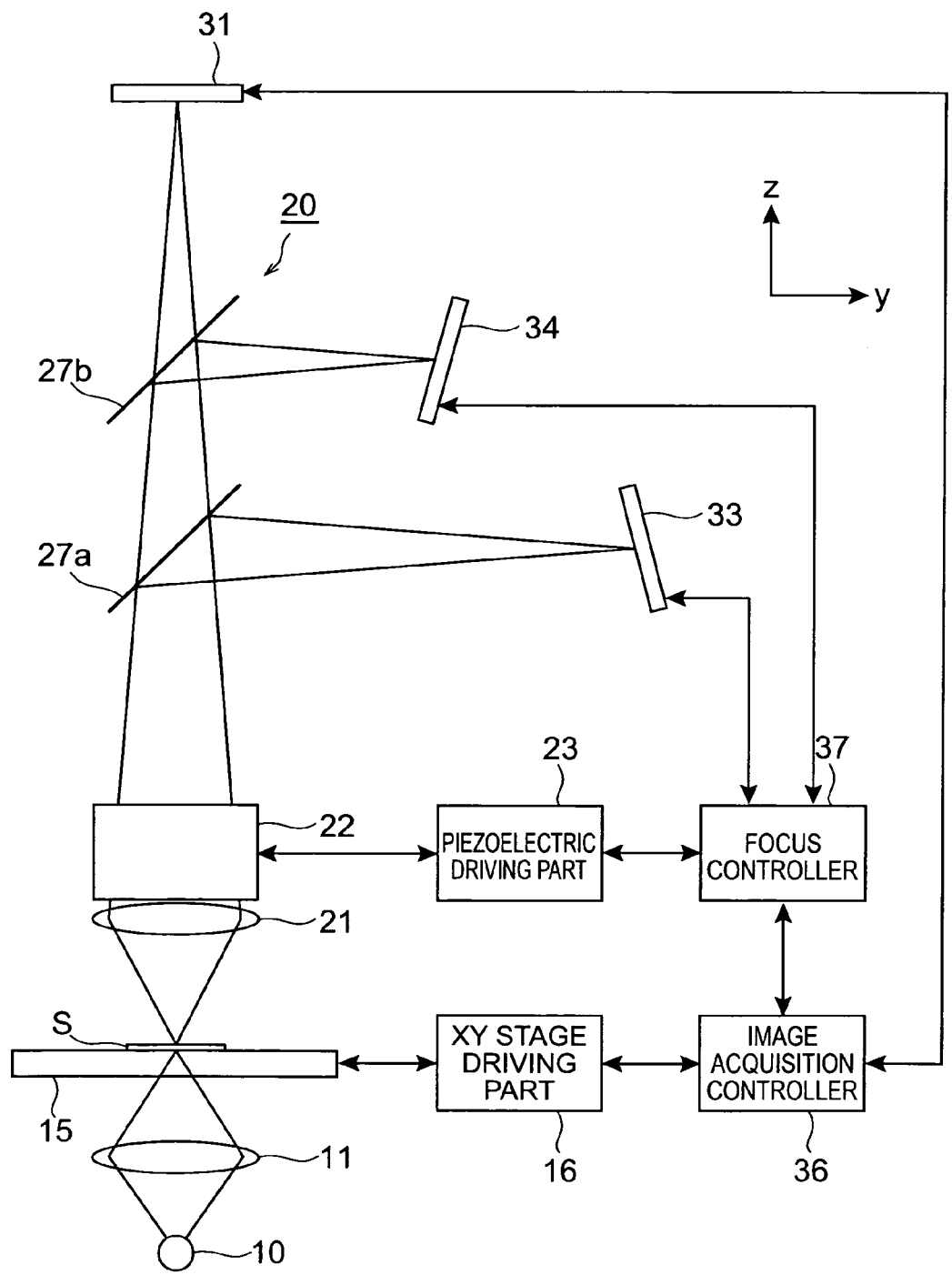
FIG. 10 is a block diagram showing the construction of a third embodiment of a microscope system.

FIG. 10 is a block diagram showing the construction of a third embodiment of the microscope system according to the present invention. In this embodiment, the irradiation light source 10, the light converging lens 11, the sample stage 15, the XY stage driving part 16, the piezoelectric driving part 23, the image acquisition controller 36 and focus controller 37 are the same as the embodiment shown in FIG. 1.

The light guiding optical system 20 is equipped at the upper side of the sample stage 15 with respect to the sample S on the sample stage 15. In this embodiment, the light guiding optical system 20 has an objective lens 21 and beam splitters 27a and 27b. A piezoelectric actuator 22 for driving the objective lens 21 in the z-axis direction is equipped for the objective lens 21.

A photodetector 31 serving as first image pickup means is disposed on the optical path on which light from the objective lens 21 passes through the beam splitters 27a and 27b. Furthermore, a CCD camera 33 is disposed on the optical path to which the light from the objective lens 21 is reflected by the upstream beam splitter 27a in a state where the image pickup face is inclined with respect to the optical path so that the optical path length varies along the z-axis direction. Furthermore, a CCD camera 34 is disposed on the optical path to which the light from the objective lens 21 is reflected by the downstream beam splitter 27b in a state where the image pickup face is inclined with respect to the optical path so that the optical path length varies along the z-axis direction and also in the opposite direction to the camera 33.

In FIG. 10, the second image pickup means for focus control is constructed by the CCD cameras 33 and 34 disposed being inclined in opposite directions with the z-axis direction set as the inclination direction. By performing the focus measurement using the two image pickup devices inclined in opposite directions, even when the contrast pattern of the sample S itself is non-uniform, focus control can be suitably performed by suppressing the effect of the non-uniform contrast pattern of the sample S. Furthermore, in the construction as described above, it is preferable that the two cameras 33 and 34 are disposed so that the inclinations thereof are symmetrical to each other with respect to the optical axis.

In this embodiment, the CCD cameras 33 and 34 are designed so that the optical path lengths thereof vary in opposite directions along a predetermined variation direction. Accordingly, the precision of focus control can be enhanced. These CCD cameras 33 and 34, in general, may be designed so that the optical path lengths thereof vary at different variation rates along the predetermined variation direction. This construction contains a construction where the optical path lengths vary in the same direction, but at different variation rates, for example.

Figure 11:
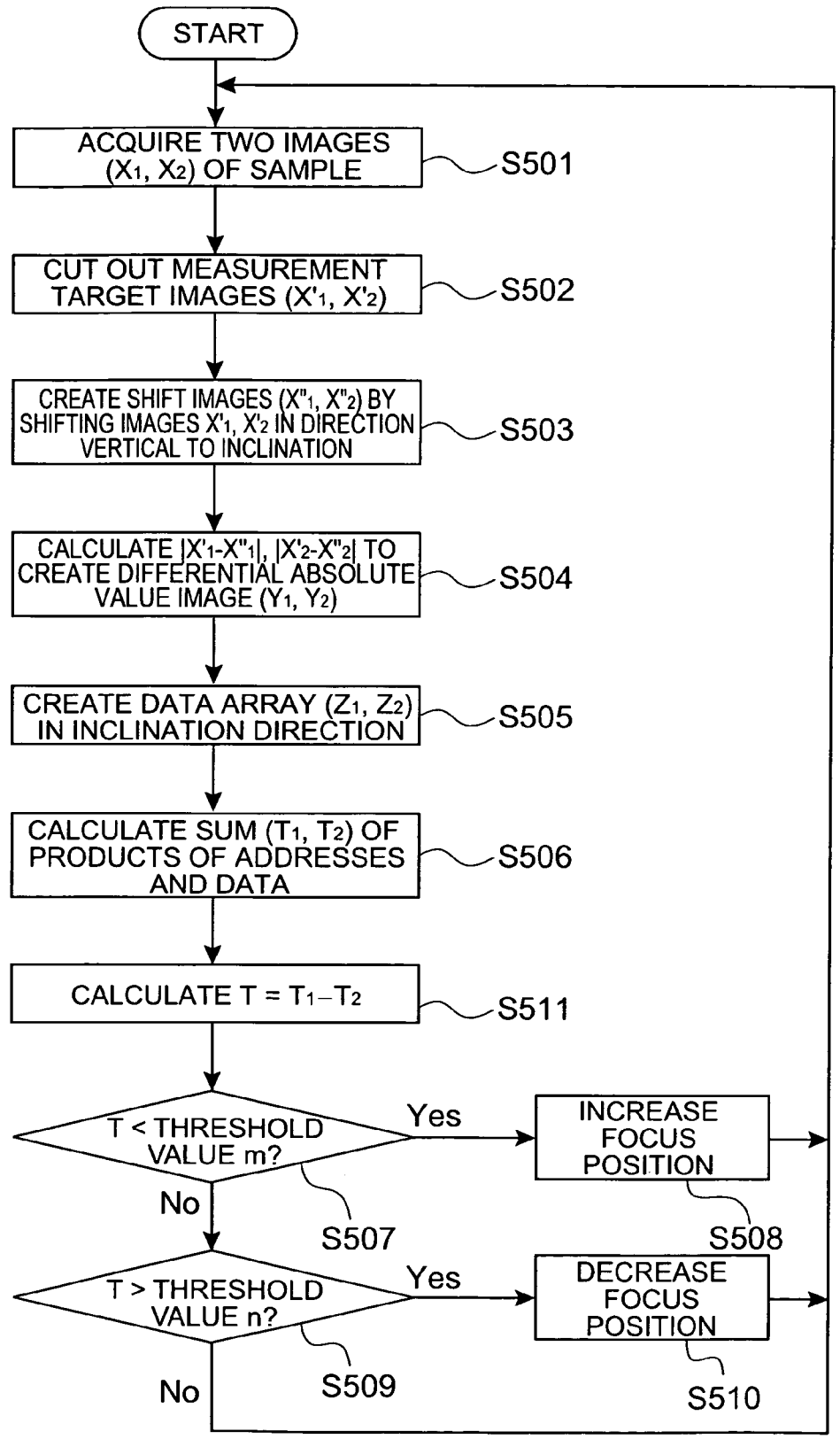
FIG. 11 is a flowchart showing an example of a focus control method.

The focus control method for the microscope system shown in FIG. 10 will be described. FIG. 11 is a flowchart showing an example of the focus control method. Focus control described below is carried out by focus controller 37 in the construction shown in FIG. 10. Furthermore, the analyzing method of the image is the same as the focus control method shown in FIG. 3 and FIG. 4.

In this control method, two two-dimensional images $X_1$ and $X_2$ of the sample S are acquired by the CCD cameras 33 and 34 (step S501). Measurement target images $X_1'$ and $X_2'$ along the respective inclination directions are cut out from the images $X_1$, $X_2$ (S502). These measurement target images $X_1'$ and $X_2'$ are inclined in opposite directions with respect to the z-axis direction.

Subsequently, shift images $X_1''$ and $X_2''$ are created by shifting the cut-out measurement target images $X_1'$ and $X_2'$ by a fixed number of pixels in the direction vertical to the inclination (S503). With respect to the image $X_1$ acquired by the camera 33, the difference $(X_1'-X_1'')$ between the image $X_1''$ and the image $X_1'$ is calculated, and the absolute value thereof $|X_1'-X_1''|$ is calculated to create a differential absolute value image $Y_1$. Furthermore, with respect to the image $X_2$ acquired by the camera 34, the difference $(X_2'-X_2'')$ is calculated between the image $X_2''$ and the image $X_2'$, and then the absolute value thereof $|X_2'-X_2''|$ is calculated to create the differential absolute value image $Y_2$ (S504).

Subsequently, with respect to the differential absolute value images $Y_1$ and $Y_2$, an average value in the direction vertical to the inclination is calculated, and the data arrays $Z_1$ and $Z_2$ in the inclination direction are created (S505). With respect to each data of the data arrays $Z_1$ and $Z_2$, the address at the center position is set to 0, and addresses are allocated to the data at the respective positions. The sum $T_1$ and $T_2$ is calculated (S506) by obtaining the product of addresses and data of the data arrays $Z_1$ and $Z_2$. The allocation of the addresses to the data arrays $Z_1$ and $Z_2$ is carried out in the same direction with respect to the z-axis direction corresponding to the inclination direction of the image pickup face. In the focus control method shown in FIG. 11, the difference $T=T_1-T_2$ between the sums $T_1$ and $T_2$ calculated for the two images $X_1$ and $X_2$ acquired by the cameras 33 and 34 is calculated (S511). By referring to the difference T of the sums, focus control using threshold values m and n is carried out (S507 to S510).

Focus control operation of the steps S501 to S511 is repeated while scanning the image pickup position of the sample S, whereby the image of the sample S can be acquired with high image quality at high speed. Particularly, in this embodiment, the images $X_1$ and $X_2$ acquired by the CCD cameras 33 and 34 which are inclined in opposite directions are used, the difference T between the sums $T_1$ and $T_2$ calculated for the respective images is calculated, and focus control is carried out, thereby reducing the influence of the contrast pattern of the sample S itself.

An example of the focus control method using the microscope system described above will be described. Here, in the following description, with respect to the two CCD cameras 33 and 34 constituting the second image pickup means for focus control, the CCD camera 33 at the front stage is referred to as a camera 1, and the CCD camera 34 at the rear stage is referred to as a camera 2.

In this example, a pathological sample of sarcomatoid carcinoma of the oral cavity is used as the sample S. This pathological sample is set in a microscope (NIKONTMD, 20×, NA0.75), and a CCD camera (ORCA, produced by Hamamatsu Photonics K.K.) is disposed. In this example, in order to check the effect by using the two images in opposite directions with respect to the inclination direction, a single CCD camera is used and the focus measurement is twice carried out while varying the arrangement angle of the CCD camera at θ=±25°. At this time, both ends in the inclination direction of the image pickup face of CCD have a depth of approximately 3.7 mm in the optical axis direction. This is equivalent to about 9 μm in terms of the depth on the sample because variation in the optical axis direction on the sample S is equal to the square of magnification on the image pickup face.

In the images for focus control which are acquired by the two CCD cameras, the size of the measurement target image $X_1'$ and $X_2'$ was set to a×b'=1024 pixels×190 pixels, and the focus measurement was carried out for five points at which the deviation of the focus position from the correct focus position was −4 μm, −2 μm, 0 μm, 2 μm, and 4 μm.

FIG. 12 to FIG. 16 show examples of measurement target images used for focus control. Here, the images (a) and (b) of FIG. 12 show (a) the measurement target image $X_1'$ of the camera 1 and (b) the measurement target image $X_2'$ of the camera 2 which are acquired when the deviation of the focus position is −4 μm. The images (a) and (b) of FIG. 13 show (a) the measurement target image $X_1'$ of the camera 1 and (b) the measurement target image $X_2'$ of the camera 2 which are acquired when the deviation of the focus position is −2 μm.

The images (a) and (b) of FIG. 14 show (a) the measurement target image $X_1'$ of the camera 1 and (b) the measurement target image $X_2'$ of the camera 2 which are acquired when the deviation of the focus position is 0 μm. The images (a) and (b) of FIG. 15 show (a) the measurement target image $X_1'$ of the camera 1 and (b) the measurement target image $X_2'$ of the camera 2 which are acquired when the deviation of the focus position is 2 μm. The images (a) and (b) of FIG. 16 show (a) the measurement target image $X_1'$ of the camera 1 and (b) the measurement target image $X_2'$ of the camera 2 which are acquired when the deviation of the focus position is 4 μm.

Shift images $X_1''$ and $X_2'$ are created by shifting the two kinds of measurement target images $X_1'$ and $X_2'$ by four pixels, and the differential absolute value images $Y_1$ and $Y_2$ and the data arrays $Z_1$ and $Z_2$ are determined from the images X' and X''. Then, the focal point center-of-gravity data F1, F2 corresponding to the sums $T_1$ and $T_2$ of the products of the addresses and the data in the data arrays $Z_1$ and $Z_2$ are determined. Furthermore, the difference F=F1−F2 between the focal point center-of-gravity data F1 and F2 (the difference $T=T_1-T_2$ between the sums $T_1$ and $T_2$) is calculated, and used for focus control.

Figure 17:
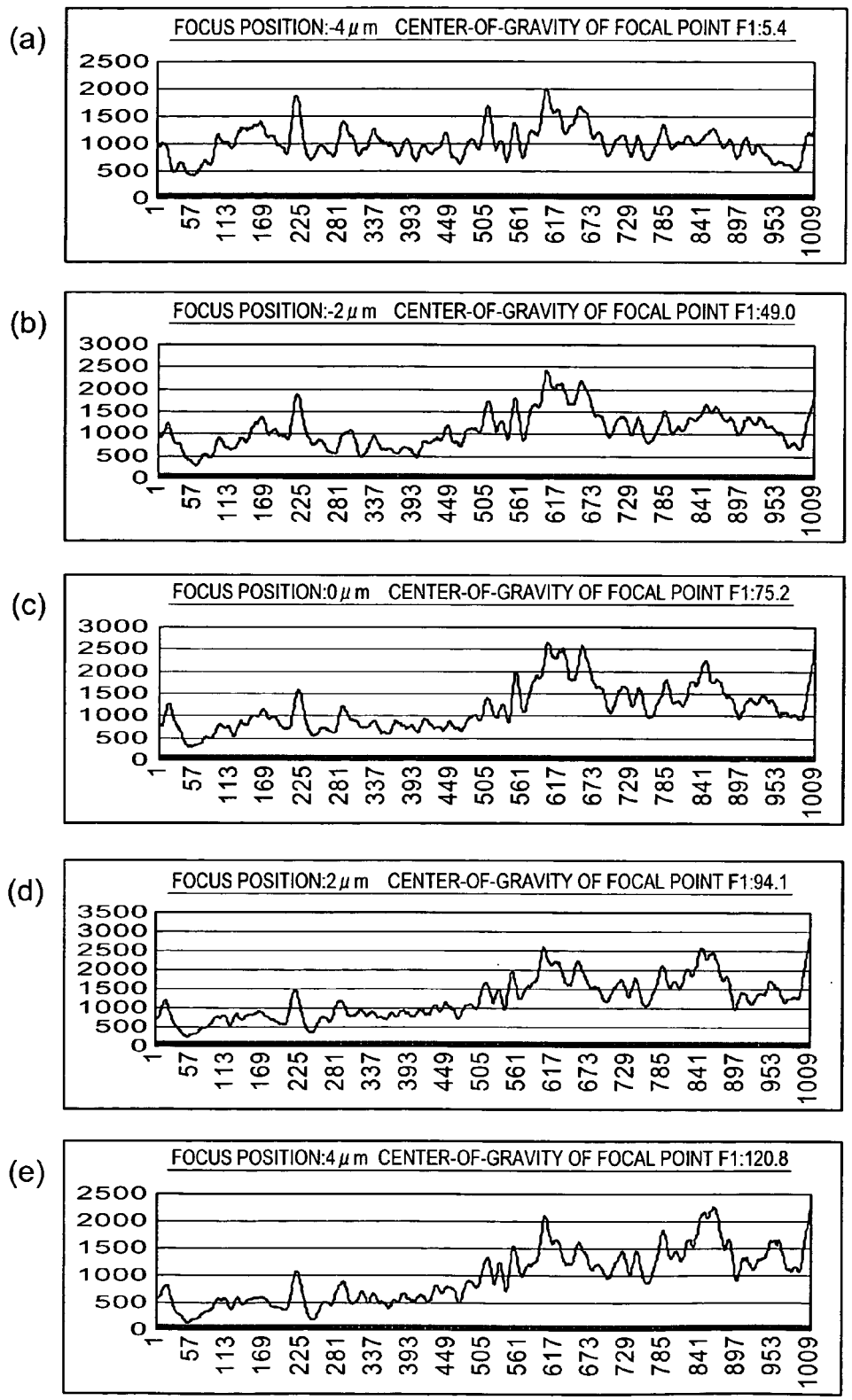
FIG. 17 is a figure including graphs showing contrast variations in the measurement target images shown in FIGS. 12 to 16.

FIG. 17 is a figure including graphs showing the contrast variations in the measurement target images $X_1$ in the camera 1 shown in images (a) of FIG. 12 to FIG. 16. In the graphs (a) to (e) of FIG. 17, the abscissa axis represents the pixel position in the inclination direction, and the ordinate axis represents the data array $Z_1$ corresponding to the contrast at each position. The graphs (a) to (e) of FIG. 17 correspond to the image (a) of FIG. 12, the image (a) of FIG. 13, the image (a) of FIG. 14, the image (a) of FIG. 15 and the image (a) of FIG. 16, respectively.

From the data arrays $Z_1$, the focal point center-of-gravity F1 (sum $T_1$) corresponding to each focus position is determined as (a) F1=5.4 for the focus position −4 μm, (b) F1=49.0 for the focus position −2 μm, (c) F1=75.2 for the focus position 0 μm, (d) F1=94.1 for the focus position 2 μm and (e) F1=120.8 for the focus position 4 μm. This result indicates that all the values of F1 are positive in the variation of the value of the focal point center-of-gravity F1 determined from the data array $Z_1$ with respect to the deviation of the focus position and there is no point at which a negative value is shifted to a positive value. The variation of the value of the focal point center-of-gravity F1 is caused by variation of the contrast pattern of the sample S itself.

Figure 18:
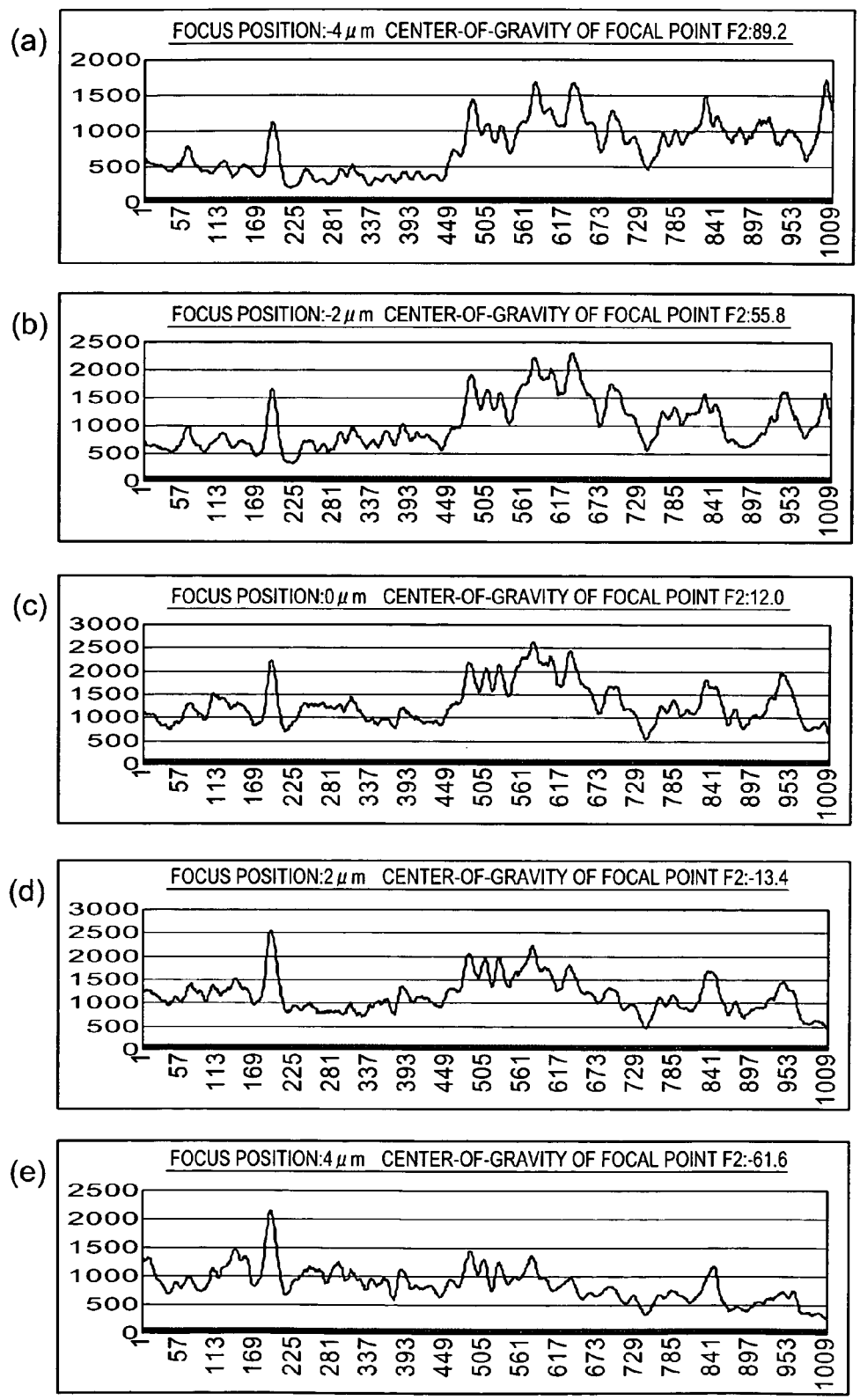
FIG. 18 is a figure including graphs showing contrast variations in the measurement target images shown in FIGS. 12 to 16.

FIG. 18 is a figure including graphs showing the contrast variations in the measurement target images $X_2$ of the camera 2 shown in images (b) of FIG. 12 to FIG. 16. In the graphs (a) to (e) of FIG. 18, the abscissa axis represents the pixel position in the inclination direction, and the ordinate axis represents the data array $Z_2$ corresponding to the contrast at each position. The graphs (a) to (e) of FIG. 18 correspond to the image (b) of FIG. 12, the image (b) of FIG. 13, the image (b) of FIG. 14, the image (b) of FIG. 15 and the image (b) of FIG. 16, respectively.

From these data arrays $Z_2$, the focal point center-of-gravity F2 (sum $T_2$) corresponding to each focus position is determined as (a) F2=89.2 for the focus position −4 μm, (b) F2=55.8 for the focus position −2 μm, (c) F2=12.0 for the focus position 0 μm, (d) F2=−13.4 for the focus position 2 μm and (e) F2=−61.6 for the focus position 4 μm, respectively.

Furthermore, from these focal point center-of-gravity data F1 and F2, the difference F of the focal point center-of-gravity data (the difference T of the sums) is calculated as (a) F=−83.8 for the focus position −4 μm, (b) F=−6.8 for the focus position −2 μm, (c) F=63.2 for the focus position 0 μm, (d) F=107.5 for the focus position 2 μm and (e) F=182.4 for the focus position 4 μm. From the analysis result acquired by analyzing the images acquired by the two cameras inclined in opposite directions with respect to the optical axis, it is apparent that the deviation of the focus position and the variation of the value of the difference F in focal point center-of-gravity determined from the data arrays $Z_1$ and $Z_2$ are well associated with each other irrespective of the contrast pattern owned by the sample S itself. Accordingly, by referring to such an analysis result, focus control for image pickup can be suitably performed.

The microscope system according to the present invention will be further described.

Figure 19:
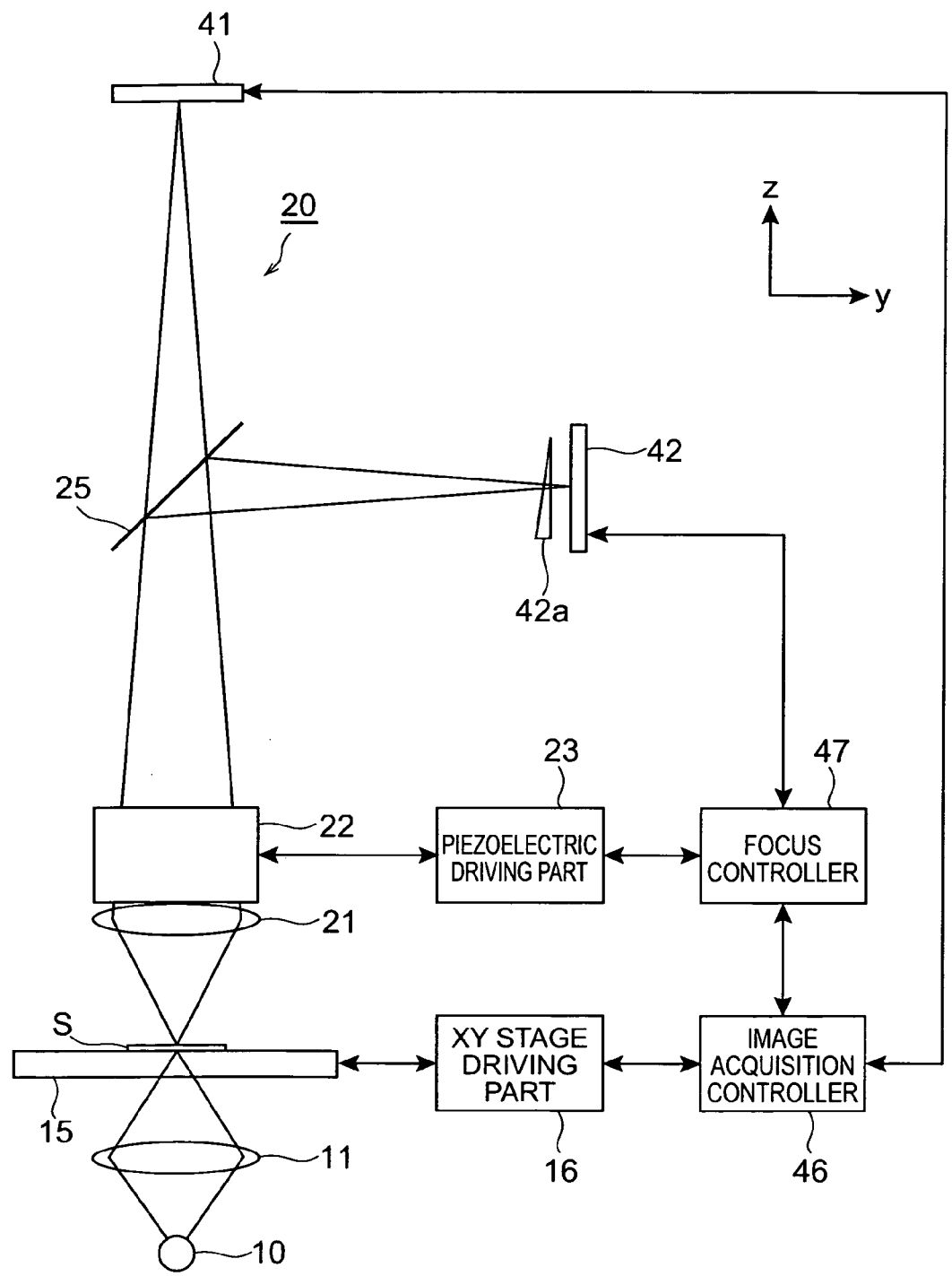
FIG. 19 is a block diagram showing the construction of a fourth embodiment of a microscope system.

FIG. 19 is a block diagram showing the construction of a fourth embodiment of the microscope system of the present invention. In this embodiment, the irradiation light source 10, the light converging lens 11, the sample stage 15, the XY stage driving part 16, the light guiding optical system 20, the piezoelectric actuator 22 and the piezoelectric driving part 23 are the same as those of the embodiment shown in FIG. 1.

A photodetector 41 is disposed on the first optical path at a position corresponding to the image forming plane of an optical image of the sample S which passes through the beam splitter 25. The photodetector 41 serves as first image pickup means used to acquire an image (first image) based on the optical image split to the first optical path for image acquisition by the beam splitter 25. As the photodetector 41, specifically a linear sensor for acquiring a one-dimensional image of the sample S or an image sensor which can acquire a two-dimensional image may be used.

Furthermore, an image pickup device 42 is disposed on the second optical path at a position corresponding to the image forming plane of an optical image of the sample S which is reflected by the beam splitter 25. The image pickup device 42 comprises a CCD camera for acquiring a two-dimensional image, and it serves as second image pickup means for acquiring an image (second image) based on the optical image split to the second optical path for focus control by the beam splitter 25. In the microscope system shown in FIG. 19, focus control for image pickup is carried out by using the two-dimensional image of the sample S acquired by the CCD camera 42.

Specifically, the CCD camera 42 is disposed so that the image pickup face thereof is substantially coincident with the xz plane perpendicular to the second optical path. An optical path length changing member 42a is disposed at a predetermined position with respect to the image pickup face between the beam splitter 25 and the camera 42. The optical path length changing member 42a is formed of a light transmissible material through which light from the sample S is transmitted and designed in a wedge shape so that the thickness thereof varies along the z-axis direction. At this time, the optical path length in the light guiding optical system 20 through which the light is guided from the sample S to the CCD camera 42 varies in the image pickup face of the CCD camera 42 along the z-axis direction with the z-axis direction as the variation direction.

An image acquisition controller 46 and a focus controller 47 are equipped for the sample stage 15, the light guiding optical system 20, the photodetector 41, and the CCD camera 42. The image acquisition controller 46 serves as control means for controlling the image acquiring operation of the sample S by controlling the acquisition of the image of the sample S and the setting of the image pickup position to the sample S. Specifically, the image acquisition controller 46 controls the acquisition of the image by the photodetector 41. The controller 46 controls the driving of the sample stage 15 through the XY stage driving part 16 to set or vary the image pickup position on the optical axis of the microscope optical system for the sample S mounted on the sample stage 15.

Focus controller 47 analyzes the image acquired by the CCD camera 42 according to a predetermined analysis method, and controls the focal point of the image pickup of the photodetector 41 on the basis of the analysis result. In this embodiment, focus controller 47 controls the driving of the piezoelectric actuator 22 through the piezoelectric driving part 23 to adjust the position of the objective lens 21 in the z-axis direction, thereby performing the image pickup focus control.

Here, the optical path length changing member 42a which is designed to be a wedge shape is disposed at the front side of the CCD camera 42, serving as the image pickup device for focus control, with respect to the optical axis of the second optical path as described above. Therefore, the two-dimensional image acquired by the CCD camera 42 becomes an image in which the deviation from the focus position varies along the z-axis direction as in the case of the construction shown in FIG. 1 in which the CCD camera 32 is disposed being inclined. Focus control information such as the deviation of the image pickup focal point, the necessity or non-necessity of the focusing, the correction amount required to match the focal point, etc., can be acquired by analyzing in focus controller 47 the image in which the deviation from the focus position varies along a predetermined variation direction as described above.

The effect of the microscope system according to this embodiment will be described.

In the microscope system shown in FIG. 19, the two image pickup means of the photodetector 41 and the CCD camera 42 are equipped for the sample S targeted to acquire images. Accordingly, the actual image acquisition by the photodetector 41 and the image acquisition for focus control by the CCD camera 42 can be separately performed. The construction as described above enables the image acquisition of the sample S and the image pickup focus control to be simultaneously performed. That is, the image of the sample S can be acquired through the photodetector 41 by the image acquisition controller 46 while the focal point can be automatically controlled by focus controller 47 while referring to the image acquired by the CCD camera 42.

Furthermore, in the system described above, the CCD camera 42 which can acquire a two-dimensional image is used as the second image pickup device used for focus control, and also the optical path length changing member 42a whose thickness varies in the z-axis direction is disposed at the front side of the camera 42 so as to satisfy such an image pickup condition where an optical path length at which an optical image is guided from the sample S varies in the z-axis direction. According to the construction of analyzing the two-dimensional image acquired by using the camera 42 and the optical path length changing member 42a as described above and carrying out focus control, it is unnecessary to irradiate a laser beam for measuring the focal point to the sample S. Therefore, both the image acquisition of the sample S and the image pickup focus control can be suitably performed.

As compared with the construction of FIG. 1 in which the second image pickup device used for focus control is disposed being inclined with respect to the optical axis, the construction of this embodiment carries out the focus measurement by combining the image pickup device and the optical path length changing member. The construction as described above can also suitably implement the image pickup focus control. In general, the second image pickup means may be designed and disposed on the optical path so that the optical path length in the light guiding optical system varies along a predetermined variation direction within the image pickup face.

Particularly in the construction using the optical path length changing member, it is unnecessary to dispose the image pickup device being inclined, and thus there is an advantage that it can be easily mounted on the microscope. Furthermore, there is a case where a fixed pattern noise caused by non-uniformity of pixels is remarkable when light is obliquely made incident to the image pickup face of the CCD camera. However, such a noise problem does not occur in the construction where the image pickup device is disposed vertically to the optical axis.

Since the variation in the optical axis direction on the sample S is equal to the square of magnification on the image pickup face, a focus position controllable range is limited in the construction where the image pickup device is inclined. On the other hand, in the construction where the optical path length changing member is used, the shape of the optical path length changing member can be selected in conformity with the focus position range to be controlled. The difference $\Delta x$ in the optical path length (optical distance) when the optical path length changing member is used as described above is calculated from the thickness d and the refractive index n of the glass or the like of the changing member according to $\Delta x = d(n-1)/n$.

With respect to the optical path length changing member disposed at the front side of the second image pickup device, various shapes may be used as shown in construction examples (a) to (f) of FIG. 20. Of these optical path length changing members shown in FIG. 20, the construction example (a) of FIG. 20 corresponds to a wedge shape in which the thickness continuously varies along the variation direction of the optical path length described above with reference to FIG. 19. The construction example (b) of FIG. 20 corresponds to a step wedge shape in which the thickness varies stepwise. In the construction example (c) of FIG. 20, a lens array in which a plurality of micro lenses different in focus distance are arranged along the variation direction is used as the optical path length changing member.

In the construction examples (d) to (f) of FIG. 20, optical path length changing members having a plurality of wedge shapes which are different in thickness variation amount or variation direction (variation rate of thickness) are used in combination. By using the plurality of types of members, the focus measurement can be performed under various conditions. For example, according to the construction using a wedge member having a small wedge slope corresponding to a thickness variation rate and a wedge member having a large wedge slope in combination as shown in the construction example (e) of FIG. 20, the measurement range of the focus measurement and the resolution can be selected in accordance with the slope of the wedge to carry out focus control with high precision.

In this case, for example, the following focus control methods can be used. First, the focus position is measured by using the large-slope wedge member to adjust the focus position with low precision. Subsequently, the focus position is adjusted with high precision by using the small-slope wedge member. According to the control method as described above, the setting of the focus position can be quickly and simply performed at the start time of the image acquiring operation.

Alternatively, the focus position is adjusted by the small-slope wedge member during the image acquiring operation. When the focus position is not measured, the focus position is measured by using the large-slope wedge member, and the focus position is adjusted with low precision. Furthermore, the focus position is adjusted with high precision by using the small-slope wedge member again. According to the control method as described above, focus control can be suitably implemented even in a case where a sample targeted to acquire images is a sample having a large thickness variation.

When the microscope is designed so that the magnification thereof can be set to a plurality of values, it is preferable to provide wedge members having slopes corresponding to the plurality of magnifications. In this case, even when the magnification of the microscope is changed, the microscope system can be designed so that it is unnecessary to optically and mechanically change the focal point measurement part.

In the construction using the optical path length changing member, the changing member may be directly fixed to the image pickup device being brought into close contact with the image pickup device or disposed so as to be spaced from the image pickup device at some distance. Furthermore, an optical element other than the optical path length changing member through which light passes may be used as the optical path length changing means. In the microscope system shown in FIG. 19, the specific focus control method is also the same as the microscope system shown in FIG. 1.

An example of the focus control method using the microscope system described above will be described.

Figure 21:
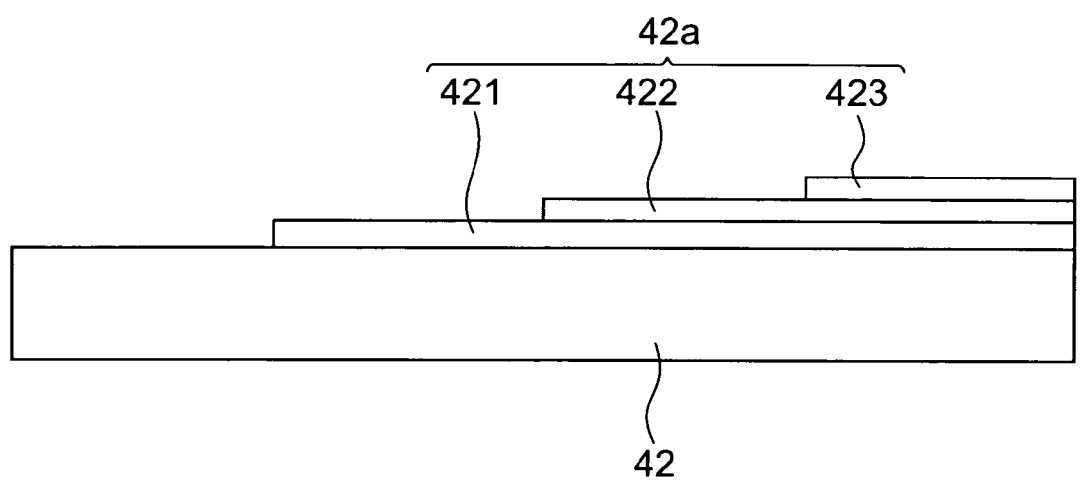
FIG. 21 is a side view showing an example of the specific construction of the optical path length changing member.

In this example, a pathological sample of leiomyosarcoma is used as a sample S. This pathological sample is set in a microscope (NIKONTMD, 20×, NA0.75), a CCD camera (ORCA, produced by Hamamatsu Photonics K.K.) is disposed, and also the optical path length changing member 42a constructed as shown in FIG. 21 is attached to the front face of the CCD camera 42. The optical path length changing member 42a is formed by adhesively attaching three glass plates 421, 422 and 423 which are 1.1 mm in thickness and different in length, and it is designed in four-step step wedge shape of 0 mm, 1.1 mm, 2.2 mm and 3.3 mm in thickness with respect to the camera 42.

In the image for focus control acquired by the CCD camera, the size of the measurement target image X' is set to a×b'=1024 pixels×190 pixels, and the focus measurement was carried out at five points at which the deviation of the focus position from the correct focus position is −4 μm, −2 μm, 0 μm, 2 μm, and 4 μm.

FIG. 22 is a figure including images showing examples of the measurement target images used for focus control. Images (a) to (e) of FIG. 22 correspond to measurement target images X' acquired when the deviation of the focus position is (a) −4 μm, (b) −2 μm, (c) 0 μm, (d) 2 μm and (e) 4 μm, respectively. Shift images X" are created by shifting the measurement target images X' by four pixels, and the differential absolute value images Y and the data array Z are determined from the images X' and X". Then, the data F of the center of gravity of the focal point which corresponds to the sum T of the products of the addresses of the data array Z and the data is determined.

Figure 23:
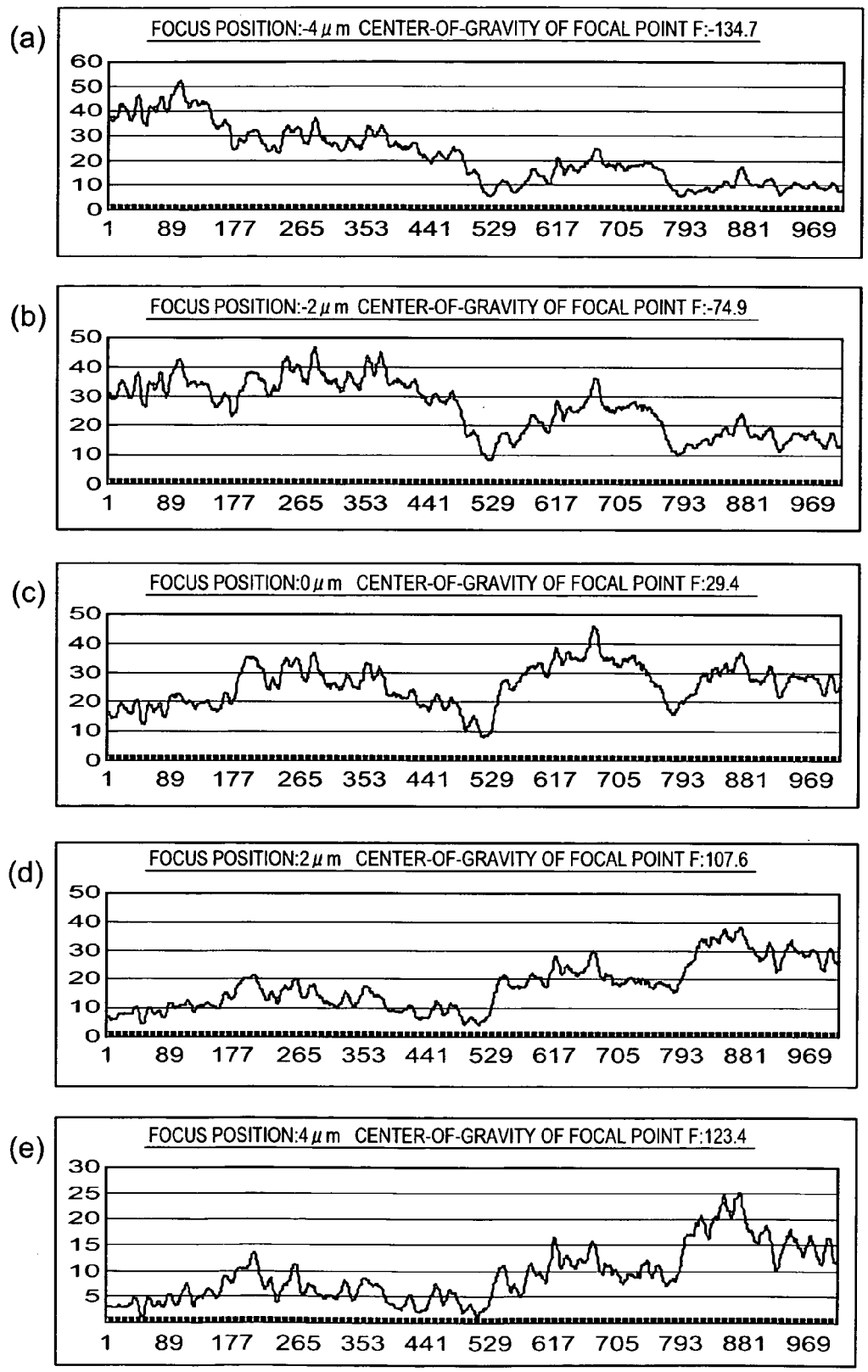
FIG. 23 is a figure including graphs showing contrast variations in the measurement target images shown in FIG. 22.

FIG. 23 is a figure including graphs showing the contrast variations in the measurement target images shown in FIG. 22. In the graphs (a) to (e) of FIG. 23, the abscissa axis represents the pixel position in the variation direction of the optical path length, and the ordinate axis represents the data array Z corresponding to the contrast at each position. Furthermore, the graphs (a) to (e) of FIG. 23 correspond to the images (a) to (e) of FIG. 22, respectively.

From these data array Z, the center of gravity of the focal point F (sum T) to the respective focus positions is calculated as (a) F=−134.7 for the focus position −4 μm, (b) F=−74.9 for the focus position −2 μm, (c) F=29.4 for the focus position 0 μm, (d) F=107.6 for the focus position 2 μm and (e) F=123.4 for the focus position 4 μm. As is apparent from the result in the analysis result acquired by the analyzing method described above, the deviation of the focus position and the variation of the value of the center of gravity of focal point F calculated from the data array Z are well associated with each other. Accordingly, by referring to the analysis result as described above, focus control for image pickup can be suitably performed.

Figure 24:
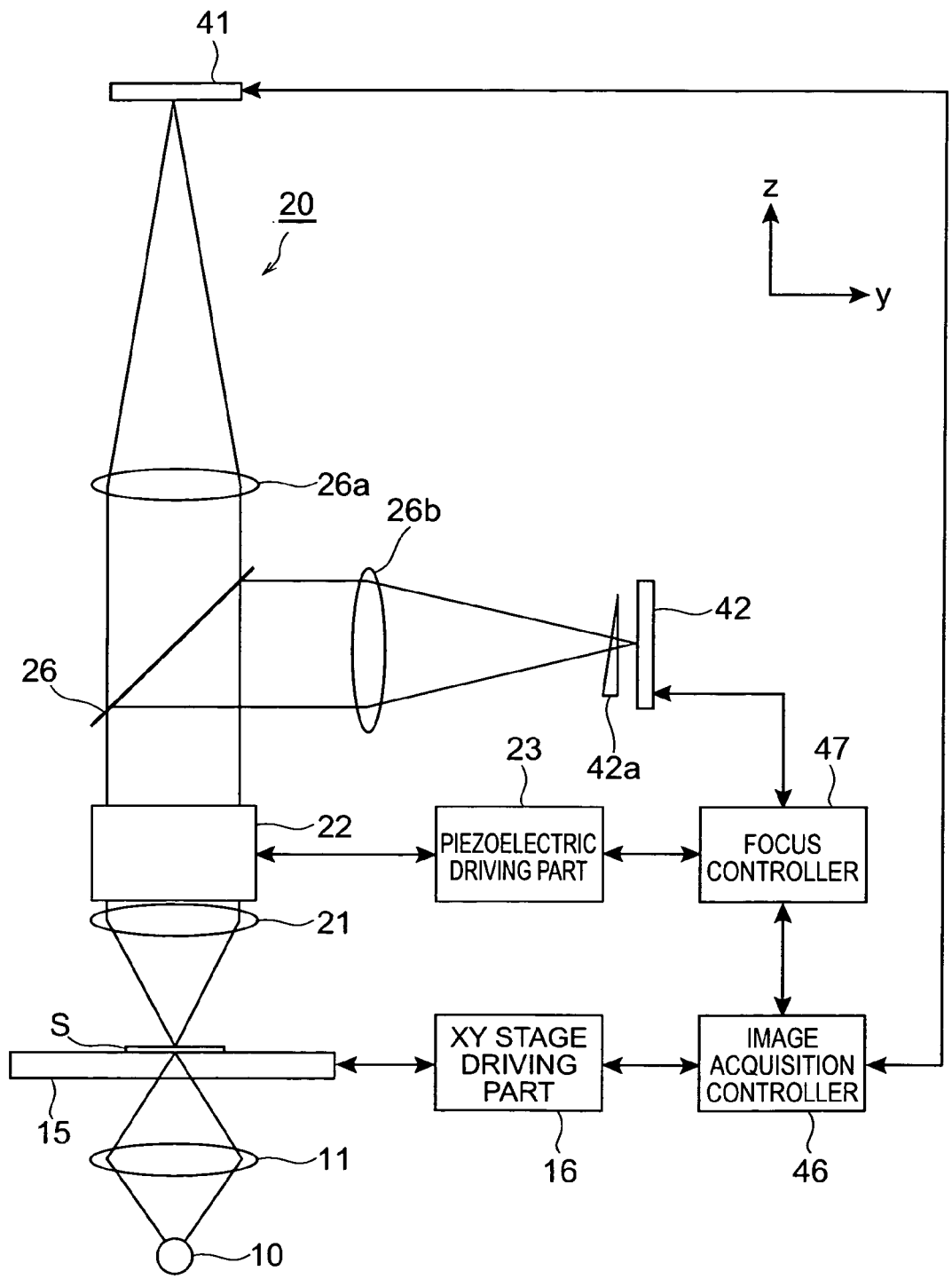
FIG. 24 is a block diagram showing the construction of a fifth embodiment of a microscope system.

FIG. 24 is a block diagram showing the construction of a fifth embodiment of a microscope system according to the present invention. In this embodiment, the irradiation light source 10, the light converging lens 11, the sample stage 15, the XY stage driving part 16, the piezoelectric driving part 23, the image acquisition controller 46 and focus controller 47 are the same as the embodiment shown in FIG. 19.

The light guiding optical system 20 is disposed above the sample stage 15 with respect to the sample S on the sample stage 15. In this embodiment, the light guiding optical system 20 has the objective lens 21, the beam splitter 26, the image forming lenses 26a and 26b. A piezoelectric actuator 22 for driving the objective lens 21 in the z-axis direction is equipped for the objective lens 21.

A photodetector 41 serving as first image pickup means is disposed on the optical path on which light from the objective lens 21 passes through the beam splitter 26. Furthermore, a CCD camera 42 serving as second image pickup means on which an optical path length changing member 42a is disposed at the front side thereof is disposed on the optical path to which the light from the objective lens 21 is reflected by the beam splitter 26.

In FIG. 24, the optical path from the objective lens 21 to the beam splitter 26 is an infinite optical path. In corresponding to this, a first image forming lens 26a for forming the image corresponding to an optical image on the photodetector 41 is disposed between the beam splitter 26 and the photodetector 41. Furthermore, a second image forming lens 26b for forming the image corresponding to an optical image on the camera 42 is disposed between the beam splitter 26 and the CCD camera 42.

According to the above construction, the magnification of the image formation to the photodetector 41 for image acquisition and the magnification of the image formation to the CCD camera 42 for focus control can be separately set by the lenses 26a and 26b as in the case of FIG. 9. Accordingly, the magnification of the image formation to the camera 42 can be set to a magnification suitable for the focus measurement without affecting the image acquisition of the sample S.

Figure 25:
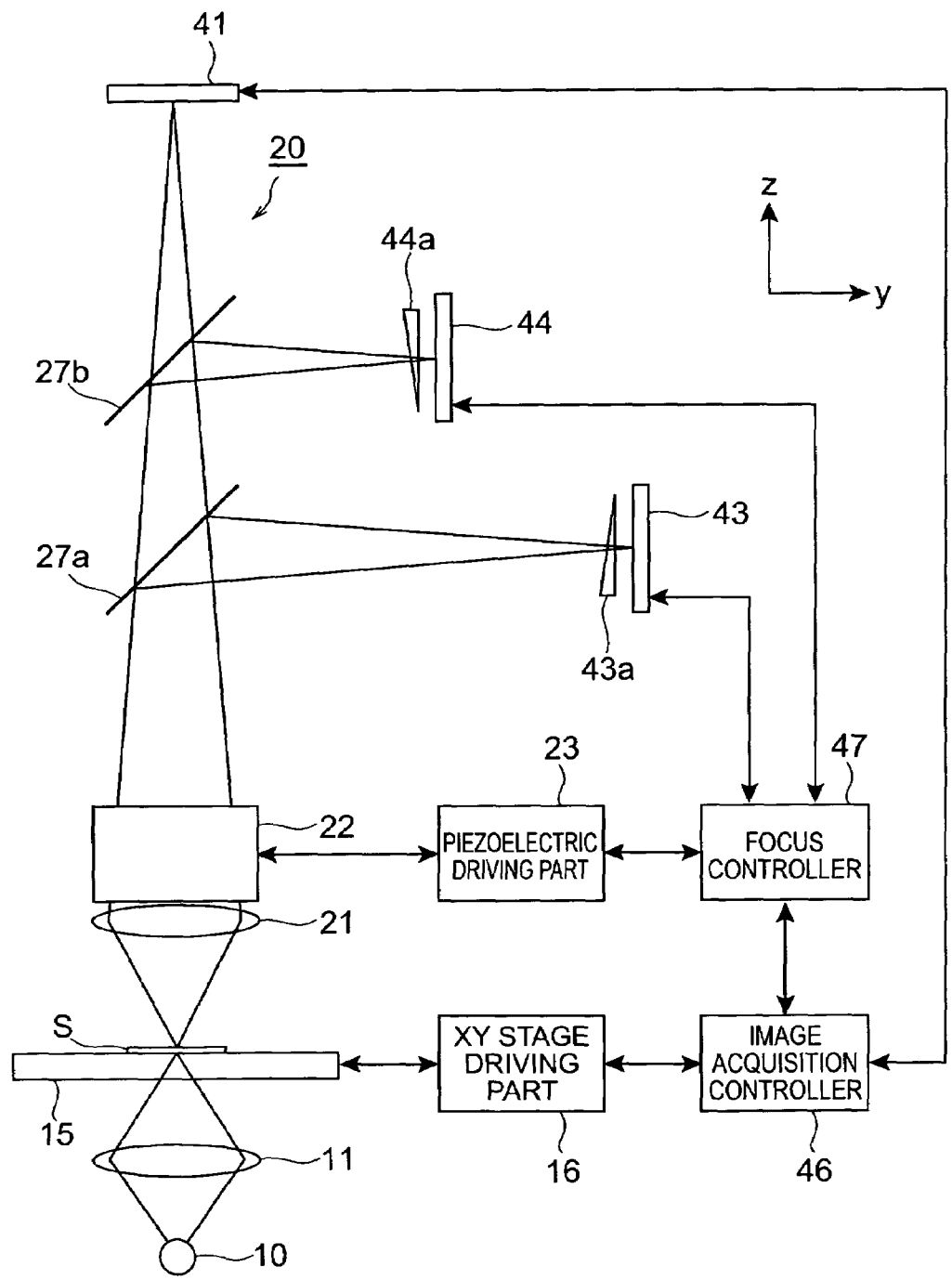
FIG. 25 is a block diagram showing the construction of a sixth embodiment of a microscope system.

FIG. 25 is a block diagram showing the construction of a sixth embodiment of the microscope system according to the present invention. In this embodiment, the irradiation light source 10, the light converging lens 11, the sample stage 15, the XY stage driving part 16, the piezoelectric driving part 23, the image acquisition controller 46 and focus controller 47 are the same as those of the embodiment shown in FIG. 19.

The light guiding optical system 20 is equipped above the sample stage 15 with respect to the sample S on the sample stage 15. In this embodiment, the light guiding optical system 20 has the objective lens 21 and beam splitters 27a and 27b. Furthermore, the piezoelectric actuator 22 for driving the objective lens 21 in the z-axis direction is equipped for the objective lens 21.

A photodetector 41 serving as a first image pickup means is disposed on the optical path on which the light from the objective lens 21 passes through the beam slitters 27a and 27b. Furthermore, a CCD camera 43 on which an optical path length changing member 43a is disposed at the front side thereof so that the optical path length varies in the z-axis direction is set on the optical path to which light from the objective lens 21 is reflected by the upstream beam splitter 27a. Furthermore, a CCD camera 44 on which an optical path length changing member 44a is disposed at the front side thereof so that the optical path length varies in the z-axis direction and in the opposite direction to the camera 43 is set on the optical path to which the light from the objective lens 21 is reflected by the downstream beam splitter 27b.

In FIG. 25, the second image pickup means for focus control is constructed by the CCD cameras 43 and 44 provided with the optical path length changing members 43a and 44a so that the optical path lengths vary in opposite directions with the z-axis direction as the variation direction. As described above, as in the case of the construction shown in FIG. 10, even when the contrast pattern of the sample S itself is non-uniform, focus control can be suitably performed by suppressing the effect thereof by carrying out the focus measurement using the two image pickup devices whose optical path lengths vary in opposite directions.

In this embodiment, the CCD cameras 43 and 44 are constructed so that the optical path lengths vary in opposite directions along a predetermined variation direction as described above. Accordingly, the precision of focus control can be enhanced. Such a construction as described above may be generally designed so that the optical path lengths can be varied along a predetermined variation direction and at different variation rates. As one of these constructions, a construction may be used whereby the optical path lengths vary in the same direction and at different variation rates.

The construction where the optical path length varies by disposing the optical path length changing member at the front side of the image pickup device is not limited to the construction using the two image pickup devices shown in FIG. 25, but it may be applied to a construction where the two types of optical path length changing members whose thickness variation directions are opposite each other as shown in a construction example (d) of FIG. 20 are equipped to one image pickup device. In this case, one optical path length changing member whose optical path length varies along a predetermined variation direction is disposed in one image pickup area of the image pickup face of the image pickup device, and another optical path length changing member whose optical path length varies along the above variation direction and at a different variation rates, preferably in the opposite direction may be disposed in another image pickup area of the image pickup face.

The microscope system of the present invention is not limited to the constructions of the above embodiments, and various modifications may be made. For example, in the above embodiments, the microscope system is designed as a transmission type microscope, however, the same focus control can also be performed in the case of a reflection type microscope or a fluorescence microscope.

Figure 26:
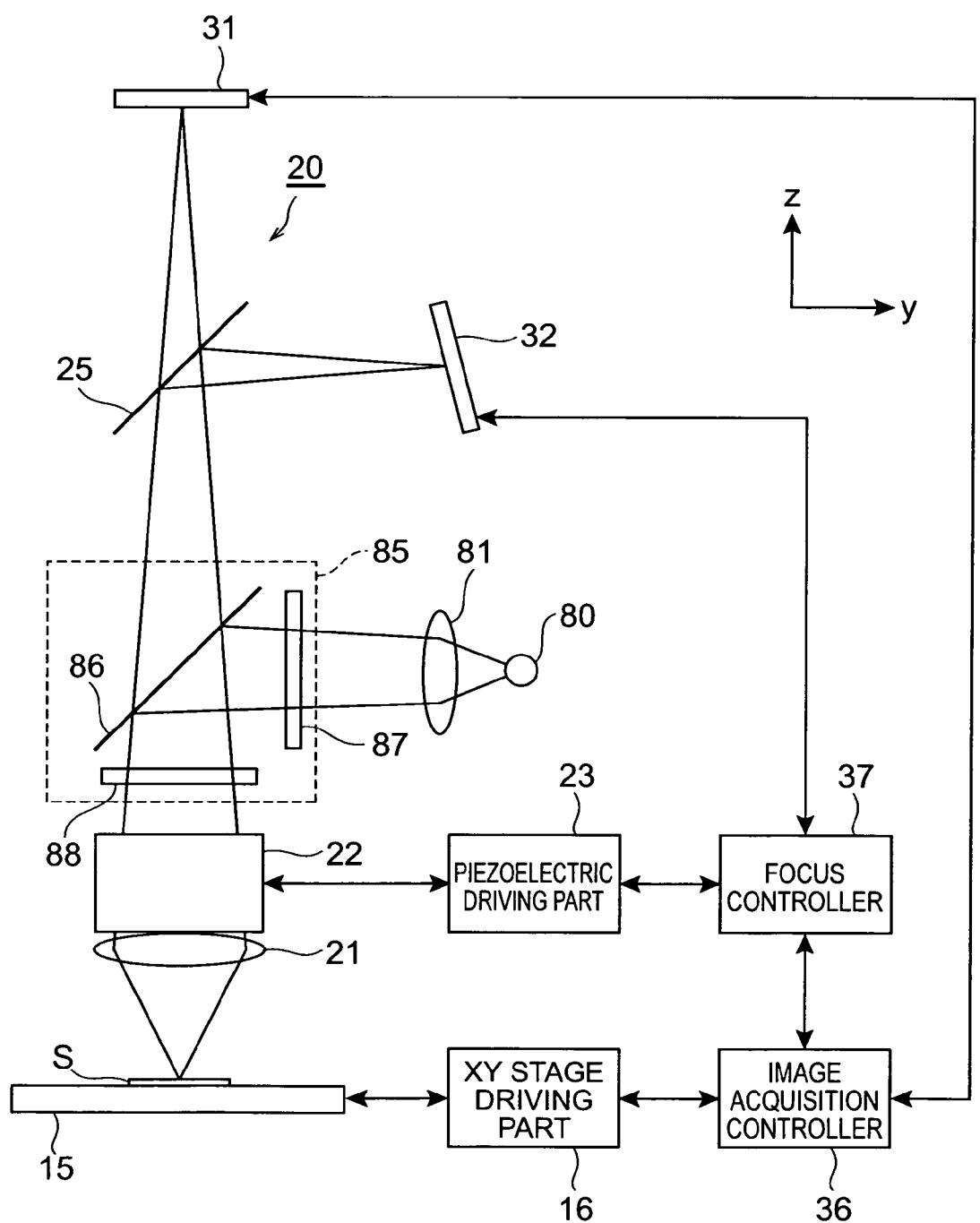
FIG. 26 is a block diagram showing the construction of a seventh embodiment of a microscope system.

FIG. 26 is a block diagram showing the construction of a seventh embodiment of the microscope system according to the present invention. The microscope system of this embodiment is a modification of the microscope system shown in FIG. 1. Specifically, as compared with the transmission type construction shown in FIG. 1 in which the irradiation light source 10 and the light converging lens 11 are disposed below the sample stage 15, the microscope system shown in FIG. 26 is designed as a fluorescence microscope in which an irradiation light source 80, a lens 81 and an irradiation optical system 85 are disposed in place of the irradiation light source 10 and the light converging lens 11.

That is, in FIG. 26, a dichroic mirror 86 is disposed between the beam splitter 25 and the objective lens 21 in the light guiding optical system 20. The dichroic mirror 86 reflects light made incident from the irradiation light source 80 through the lens 81 and irradiates the light to the sample S as exciting light, and also allows fluorescence light occurring in the sample S to pass through the beam splitter 25. Furthermore, an excitation filter 87 and a cut filter 88 are disposed between the dichroic mirror 86 and the irradiation light source 80 and between the dichroic mirror 86 and the objective lens 21, and an irradiation optical system 85 (Fluorescence filter cube) is constructed by the dichroic mirror 86, the excitation filter 87 and the cut filter 88.

In the fluorescence microscope thus constructed, focus control can be also performed as in the case of the transmission type microscope. Furthermore, when the microscope is designed to have a reflection type construction, the construction of FIG. 26 may be modified so that the dichroic mirror 86 is replaced by a half mirror, and the filters 87 and 88 are removed.

Here, as mentioned above, the construction where the optical path length varies by disposing the optical path length changing member at the front side of the image pickup device may be applied to a construction where the two types of optical path length changing members whose thickness variation directions are opposite each other as shown in a construction example (d) of FIG. 20 are equipped to one image pickup device. In this case, a first optical path length changing member whose optical path length varies along a predetermined variation direction is disposed in a first image pickup area of the image pickup face of the image pickup device, and a second optical path length changing member whose optical path length varies along the above variation direction and at a different variation rates, preferably in the opposite direction may be disposed in a second image pickup area of the image pickup face.

In this construction, in general, an optical image incident to the second image pickup area is different from an optical image incident to the first image pickup area. For this point, it is preferable to use a splitting optical system for splitting the optical image for acquiring the image used for focus control into one optical path to the first optical path length changing member and the first image pickup area of the image pickup face of the image pickup device, and another optical path to the second optical path length changing member and the second image pickup area of the image pickup face of the image pickup device.

Figure 27:
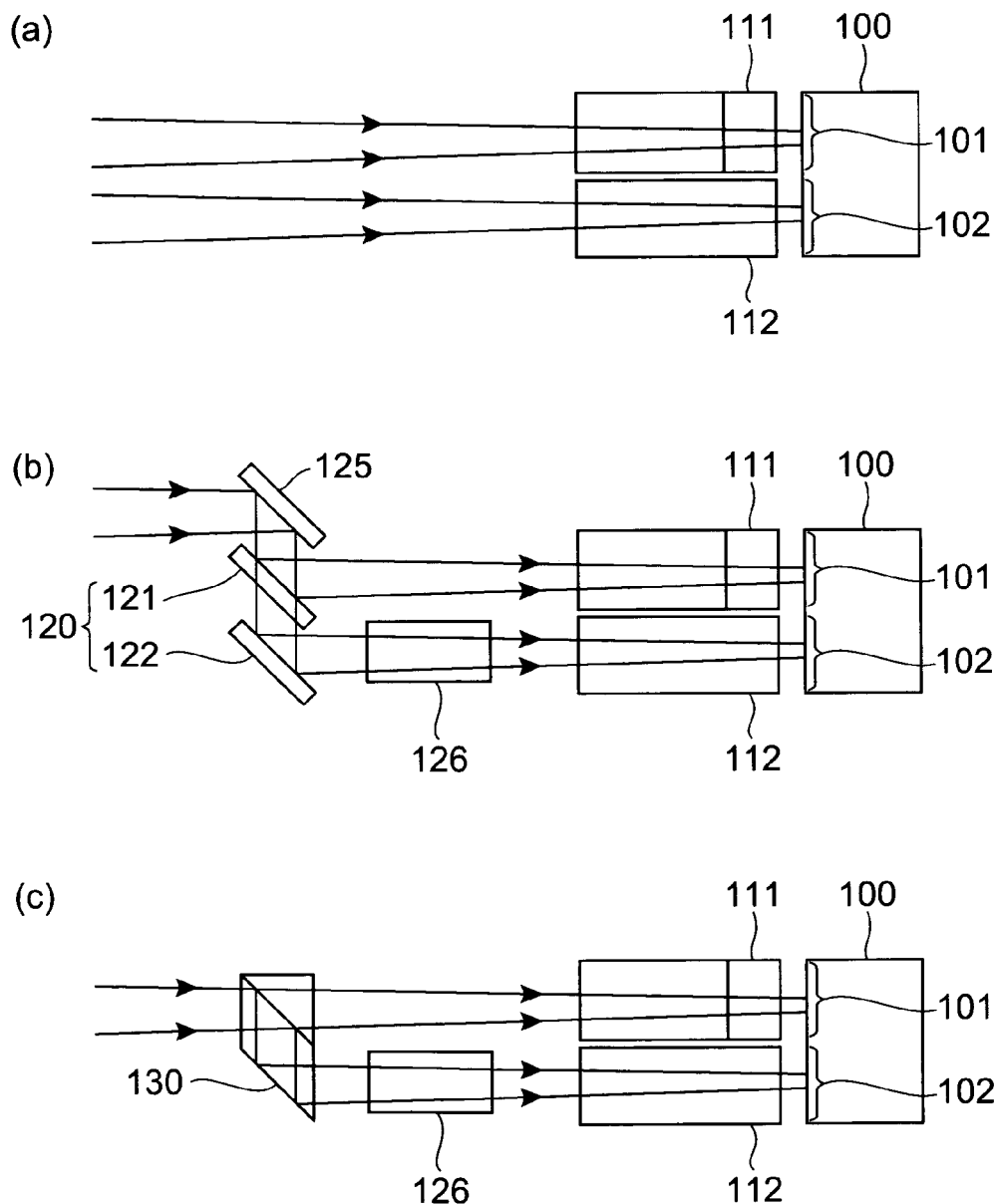
FIG. 27 is a diagram showing the construction of a splitting optical system for the image pickup device for focus control.

FIG. 27 is a diagram showing the construction of the splitting optical system for the image pickup device for focus control. In the construction (a) of FIG. 27, the first optical path length changing member 111 is disposed for the first image pickup area 101 of the image pickup device 100 for acquiring the image for focus control, and the second optical path length changing member 112, whose optical path length varies in the opposite direction to the first optical path length changing member 111, is disposed for the second image pickup area 102. In this case, as mentioned above, the optical image incident to the second image pickup area 102 is different from the optical image incident to the first image pickup area 101 of the image pickup device 100.

On the other hand, in the construction (b) of FIG. 27, the splitting optical system 120 having a 50% reflection mirror 121 for reflecting the optical image to the first image pickup area 101 and a 100% reflection mirror 122 for reflecting the optical image to the second image pickup area 102 is equipped. In this construction, the same optical image split by the splitting optical system 120 is incident to the image pickup areas 101, 102, respectively, and thus the precision of focus control can be enhanced.

Here, in the construction (b), a 100% reflection mirror 125 is disposed at the front stage of the splitting optical system 120. By using the reflection mirror 125, the range of the optical image incident to the image pickup device 100 can be restricted, and thereby the overlap of the optical images between the image pickup areas 101, 102 can be prevented. However, this reflection mirror 125 may be excluded if not necessary. In addition, in the above construction (b), the optical path length adjusting member 126 for correcting the optical path length is disposed between the reflection mirror 122 and the second image pickup area 102. As for the splitting optical system, an optical splitting prism 130 shown in the construction (c) in FIG. 27 or the like can be also used.

Furthermore, in the above construction, for the sums $T_1$ and $T_2$ calculated from the two measurement target images $X_1'$ and $X_2'$ acquired by the image pickup areas 101 and 102, it is preferable to replace the sum $T_1$ by $T_1 \times$(average value of $X_2'$/average value of $X_1'$) for correcting the difference in brightness (see the flowchart in FIG. 11).

The microscope system of the present invention is usable as a microscope system which can simultaneously perform the image acquisition of the sample and the image pickup focus control. That is, according to the microscope system of the present invention, two image pickup means are provided for the sample, and image pickup means which can acquire the two-dimensional image is used as the second image pickup means for focus control. In addition, the image pickup means is disposed so as to satisfy the image pickup condition where the light guiding optical path length varies in a predetermined direction, and the two-dimensional image thus acquired is analyzed to carry out focus control, whereby the image acquisition of the sample and the image pickup focus control can be simultaneously performed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A microscope system comprising:
    a light guiding optical system containing optical splitting means for splitting an optical image of a sample into a first optical path for image acquisition and a second optical path for focus control;
    first image pickup means which is disposed on the first optical path and used to acquire a one-dimensional or two-dimensional first image based on an optical image split to the first optical path;
    second image pickup means which is disposed on the second optical path so that an optical path length in the light guiding optical system varies along a predetermined variation direction on the image pickup face thereof and is used to acquire a two-dimensional second image for focus control based on an optical image split to the second optical path;
    focus control means for analyzing the second image acquired by the second image pickup means and controlling the focal point for image pickup by the first image pickup means on the basis of the analysis result;
    wherein the focus control means analyzes the image contrast variation in the variation direction in the second image and controls the focal point for image pickup on the basis of the analysis result;
    wherein the focus control means cuts out a measurement target image having a predetermined width along the variation direction from the second image and analyzes the image contrast variation on the basis of a differential absolute value image between the measurement target image and a shift image acquired by shifting the measurement target image in the direction vertical to the variation direction; and
    image acquisition control means for controlling acquisition of the first image acquired by the first image pickup means.

2. The microscope system according to claim 1, wherein the second image pickup means has an image pickup device in which the image pickup face thereof is disposed being inclined with respect to the second optical path at a predetermined angle so that the optical path length varies along the variation direction.

3. The microscope system according to claim 1, wherein the second image pickup means has an image pickup device and optical path length changing means which is set at a predetermined position with respect to the image pickup face of the image pickup device so that the optical path length varies along the variation direction.

4. The microscope system according to claim 3, wherein the second image pickup means has one optical path length changing means which is disposed as optical path length changing means at a predetermined position with respect to one image pickup area of the image pickup face of the image pickup device so that the optical path length varies along the variation direction, and another optical path length changing means which is disposed at a predetermined position with respect to another image pickup area of the image pickup face of the image pickup device so that the optical path length varies along the variation direction and at a variation rate different from the one optical path length changing means.

5. The microscope system according to claim 4, further comprising a splitting optical system for splitting the optical image for acquiring the second image into one optical path to the one optical path length changing means and the one image pickup area of the image pickup face of the image pickup device, and another optical path to the another optical path length changing means and the another image pickup area of the image pickup face of the image pickup device.

6. The microscope system according to claim 1, wherein the second image pickup means has two image pickup devices, one image pickup device being disposed so that the optical path length varies along the variation direction within the image pickup face, and another image pickup device being disposed so that the optical path length varies along the variation direction within the image pickup face and at a variation rate different from the one image pickup device.

7. The microscope system according to claim 1, further comprising a first image forming lens disposed on the first optical path, and a second image forming lens disposed on the second optical path, wherein the second image formatting lens has an image forming magnification smaller than that of the first image forming lens.

8. The microscope system according to claim 1, wherein the focus control means judges whether the second image is applicable to the control of the focal point for image pickup, and if it is judged that the second image is applicable, the focus control means analyzes the second image and controls the image pickup focal point on the basis of the analysis result.

* * * * *